United States Patent
Dudda et al.

(10) Patent No.: US 10,959,151 B2
(45) Date of Patent: *Mar. 23, 2021

(54) ADAPTING A MOBILE NETWORK

(71) Applicant: Telefonaktiebolaget LM Ericsson (publ), Stockholm (SE)

(72) Inventors: Torsten Dudda, Aachen (DE); Walter Müller, Upplands Väsby (SE); Mattias Bergström, Stockholm (SE); Stefan Wager, Espoo (FI); Zhiyi Xuan, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/815,577

(22) Filed: Mar. 11, 2020

(65) Prior Publication Data

US 2020/0213924 A1 Jul. 2, 2020

Related U.S. Application Data

(63) Continuation of application No. 14/761,770, filed as application No. PCT/EP2014/050868 on Jan. 17, 2014, now Pat. No. 10,631,222.

(Continued)

(51) Int. Cl.
*H04W 36/30* (2009.01)
*H04W 36/00* (2009.01)
*H04W 36/04* (2009.01)

(52) U.S. Cl.
CPC ..... *H04W 36/305* (2018.08); *H04W 36/0055* (2013.01); *H04W 36/0069* (2018.08); *H04W 36/30* (2013.01); *H04W 36/04* (2013.01)

(58) Field of Classification Search
CPC ............ H04W 36/30; H04W 36/0069; H04W 36/0055; H04W 36/04
(Continued)

(56) References Cited

U.S. PATENT DOCUMENTS 7,742,990 B2 6/2010 Sumino et al.
10,631,222 B2 * 4/2020 Dudda .................. H04W 36/30
(Continued)

FOREIGN PATENT DOCUMENTS

CN 102356569 A 2/2012
CN 102754496 A 10/2012
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 1-208.
(Continued)

*Primary Examiner* — Nghi H Ly
(74) *Attorney, Agent, or Firm* — Murphy, Bilak & Homiller, PLLC

(57) ABSTRACT

In a method for adapting a mobile network, a terminal is connected to a first access node of the mobile network via a first connection and to a second access node via a second connection. The first access node controls a data transmission for the terminal and the second access node assists in the data transmission for the terminal. The method comprises determining whether a quality of at least one of the first connection and the second connection is degraded, acquiring quality degradation information about the degradation of the quality of at least one of the first connection and
(Continued)

the second connection based on the step of determining, and adapting the mobile network based on the step of acquiring.

37 Claims, 11 Drawing Sheets

Related U.S. Application Data

(60) Provisional application No. 61/754,322, filed on Jan. 18, 2013.

(58) Field of Classification Search
USPC ............... 455/436, 442, 432.1, 435.1, 422.1; 370/331
See application file for complete search history.

(56) References Cited

U.S. PATENT DOCUMENTS

| | | | |
|---|---|---|---|
| 2002/0123362 A1* | 9/2002 | Kamel | H04L 1/0002 455/522 |
| 2008/0025337 A1 | 1/2008 | Smith et al. | |
| 2008/0227453 A1 | 9/2008 | Somasundaram et al. | |
| 2008/0261600 A1 | 10/2008 | Somasundaram et al. | |
| 2009/0137265 A1* | 5/2009 | Flore | H04W 40/248 455/525 |
| 2009/0247220 A1* | 10/2009 | Cho | H04H 20/57 455/556.1 |
| 2010/0080116 A1 | 4/2010 | Agashe et al. | |
| 2010/0172299 A1 | 7/2010 | Fischer et al. | |
| 2011/0170422 A1 | 7/2011 | Hu et al. | |
| 2012/0008596 A1* | 1/2012 | Jung | H04W 36/0033 370/331 |
| 2012/0021746 A1 | 1/2012 | Wang et al. | |
| 2012/0315909 A1* | 12/2012 | Nakamura | H04W 48/16 455/436 |
| 2013/0329594 A1* | 12/2013 | Davydov | H04W 72/0413 370/252 |
| 2014/0024374 A1 | 1/2014 | Bergman et al. | |
| 2014/0120930 A1 | 5/2014 | Harris et al. | |

FOREIGN PATENT DOCUMENTS

| | | |
|---|---|---|
| EP | 2343947 A1 | 7/2011 |
| EP | 2348771 A1 | 7/2011 |
| EP | 2448343 A1 | 5/2012 |
| JP | 2011166372 A | 8/2011 |
| RU | 2011124519 A | 12/2012 |
| WO | 2008008964 A2 | 1/2008 |
| WO | 2010150463 A1 | 12/2010 |
| WO | 2012110420 A1 | 8/2012 |
| WO | 2013070127 A1 | 5/2013 |

OTHER PUBLICATIONS

3GPP, "3rd Generation Partnership Project; Technical Specification Group Radio Access Network; Evolved Universal Terrestrial Radio Access (E-UTRA); Mobility enhancements in heterogeneous networks (Release 11)", 3GPP TR 36.839 V11.1.0, Dec. 2012, 1-53.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.8.0, Dec. 2012, 1-305.

3GPP, "3rd Generation Partnership Project; Technical Specification Group Radio Access Network; Evolved Universal Terrestrial Radio Access (E-UTRA); Requirements for support of radio resource management (Release 11)", 3GPP TS 36.133 V11.2.0, Sep. 2012, 1-673.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.3.0, Dec. 2012, 1-141.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.1.0, Jun. 2012, 1-134.

3GPP, "LTE; Evolved Universal Terrestrial Radio Access (E-UTRA); Radio Resource Control (RRC); Protocol specification", 3GPP TS 36.331 V11.2.0, Dec. 2012, 1-340.

Unknown, Author, "LTE Release 12 and Beyond", 3GPP RAN WS on Rel-12 and onwards, RWS-120003, Ljubljana, Slovenia, Jun. 11-12, 2012, 1-10.

* cited by examiner

ADAPTING A MOBILE NETWORK

RELATED APPLICATIONS

This application is a continuation of U.S. patent application Ser. No. 14/761,770, filed Jul. 17, 2015, which was the National Stage of International Application No. PCT/EP2014/050868, filed Jan. 17, 2014, which claims the benefit of U.S. Provisional Application No. 61/754,322, filed Jan. 18, 2013, each of which is incorporated by reference in its entirety.

TECHNICAL FIELD

The present invention generally relates to telecommunications, and particularly relates to methods for adapting a mobile network. Nodes, a communication system, computer programs, and computer program products are also described.

BACKGROUND

The present disclosure is described within the context of Long Term Evolution (LTE), i.e. Evolved Universal Mobile Telecommunications Systems (UMTS) Terrestrial Radio Access Network (E-UTRAN). It should be understood that the problems and solutions described herein are equally applicable to wireless access networks and user equipments (UEs) implementing other access technologies and standards. LTE is used as an example technology where the embodiments are suitable, and using LTE in the description therefore is particularly useful for understanding the problem and solutions solving the problem.

For ease of understanding, LTE Mobility is described in the following.

Radio Resource Control (RRC) (Third Generation Partnership Project (3GPP) Technical Specification (TS) 36.331, e.g. V10.8.5 (2013-01)) is the main signaling protocol for configuring, re-configuring and general connection handling in the LTE radio access network (E-UTRAN). RRC controls many functions such as connection setup, mobility, measurements, radio link failure and connection recovery. These functions are of relevance for the present disclosure, and are therefore described in some further detail below.

A UE in LTE can be in two RRC states: RRC_CONNECTED and RRC_IDLE. In RRC_CONNECTED state, mobility is network-controlled based on e.g. measurements provided by the UE. I.e. the network decides when and to which cell an UE should be handed over, based on e.g. measurements provided by the UE. The network, i.e. the LTE radio base station (called evolved Node Base station (eNodeB or eNB), respectively, in E-UTRAN) configures various measurement events, thresholds etc. based on which the UE then sends reports to the network, such that the network can make a wise decision to hand over the UE to a stronger cell as the UE moves away from the present cell.

FIGS. 1A and 1B illustrate a LTE RRC handover procedure according to 3GPP TS 36.300, e.g. V11.4.0 (2013-01), FIG. 10.1.2.1.1-1. FIGS. 1A and 1B illustrate a LTE RRC handover procedure. In a mobile network 100, a UE 102 is connected to a source eNodeB 104 of a LTE radio access network, which is controlled by a Mobility Management Entity (MME) 106 of a packet switched domain of a core network. A target eNodeB 108 is controlled by the MME 106. The user equipment 102 is exchanging data with a serving gateway 110 of the core network. During a handover, the user equipment 102 is handed over from the source eNodeB 102 source eNodeB 104 to the target eNodeB 108 of the radio access network. Corresponding user data signaling is indicated by dashed arrows. L3 control signaling is indicated by dotted dashed arrows, and L1/L2 control signaling is indicated by solid arrows. The source eNodeB 104 sends in a first step 1 management control information to the user equipment 102, which in turn sends corresponding measurement reports in a step 2 to the source eNodeB 104. Thereupon, the source eNodeB 104 performs in a step 3 a handover decision, and sends a handover request in a step 4 to the target eNodeB 108. After performing admission control in a step 5, the target eNodeB 108 sends a handover request acknowledgement in a step 6 to the source eNodeB 104, which initiates a RRC connection reconfiguration in a step 7 towards the UE 102.

FIG. 2 illustrates a simplified picture of the parts of the LTE Handover (HO) procedure relevant for the disclosure. It should be noted that the HO command is in fact prepared in the Target eNB, but the message transmitted via the Source eNB. I.e. the UE sees that the message comes from the Source eNB. A mobile network 200 comprises a source eNodeB 204 and a target eNodeB 208. A UE 202 is connected to the source eNodeB 204. Subsequent to a step 210, in which a measurement configuration is sent from the source eNodeB 204 to the user equipment 202, the user equipment 202 performs in a step 212 an A3 event in which a signal strength or signal quality of the target eNodeB 208 may be detected to be better compared to a signal strength or signal quality of the source eNodeB 204, respectively, and accordingly reports in a step 214 a measurement report to the source eNodeB 204. After a corresponding handover decision in a step 216, the source eNodeB 204 sends a handover request in a step 218 to the target eNodeB 208, which in turn sends a handover acknowledgement in a step 220 to the source eNodeB 204. The source eNodeB 204 then sends in a step 222 a handover command to the user equipment 202, which performs in a step 224 a random access procedure in which dedicated preambles are submitted to the target eNodeB 208. Further arrows 226-230 relate to a completion of the handover procedure. In the step 226 an uplink (UL) grant and a Tracking Area (TA) may be sent from the target eNodeB 208 to the UE 202. In the step 228 a HO confirm may be sent from the UE 202 to the target eNodeB 208. In the step 230 a Release context may be sent from the target eNodeB 208 to the source eNodeB 204. The steps 210, 214, 216, 218, 220, 222, 224 correspond to the steps 1, 2, 3, 4, 6, 7, and 11 in FIGS. 1A and 1B.

In RRC_IDLE, mobility is handled by UE-based cell-selection, where a nomadic UE 102, 202 selects the "best" cell to camp on, based e.g. on various specified criteria and parameters that are broadcasted in the cells. For example, various cells or frequency layers could be prioritized over other, such that the UE 102, 202 tries to camp on a particular cell as long as the measured quality of a beacon or pilot in that cell is a threshold better than some other beacon or pilot received from other cells.

The present disclosure is primarily focusing on problems associated with network-controlled mobility as described above, i.e. for an LTE UE in RRC_CONNECTED state. The problems associated with failing handovers are therefore described in further detail below.

In a regular situation, and when a RRC_CONNECTED UE 102, 202 is moving out from the coverage of a first cell (also called source cell), it should be handed over to a neighboring cell (also called target cell or second cell) before loosing the connection to the first cell. I.e. it is desirable that the connection is maintained without no or minimal disruption throughout the handover, such that the end-user is unaware of the ongoing handover. In order to succeed with this, it is necessary that the measurement report that indicates the need for mobility is transmitted by the UE 102, 202 and received by the Source eNB 104, 204, and the Source eNB 104, 204 has sufficient time to prepare the handover to the target cell (by, among other things, requesting a handover from the Target eNB 108, 208 controlling the target cell), and the UE 102, 202 receives the handover command message from the network, as prepared by the Target eNB 108, 208 in control of the target cell and sent via the source cell to the UE 102, 202, see FIGS. 1A, 1B and 2.

In addition, and in order for the handover to be successful, the UE 102, 202 must finally succeed in establishing a connection to the target cell, which in LTE requires a successful random access request in the target cell, and a subsequent HO complete message. It is noted that specifications may differ somewhat in the naming of messages. This does not limit the applicability of the present disclosure. For example, the handover command labeled as HO Command in the step 222 of FIG. 2 corresponds to the RRC Configuration Reconfiguration of the step 7 of FIG. 1A, and the handover confirm message of the step 228 of FIG. 2 corresponds to the RRC Configuration Reconfiguration Complete of the step 11 of FIG. 1A.

Thus, it is clear that in order to succeed all this, it is necessary that the sequence of events leading to a successful handover is started sufficiently early, so that the radio link to the first cell (over which this signaling takes place) does not deteriorate too much before completion of the signaling. If such deterioration happens before the handover signaling is completed in the source cell (i.e. first cell), then the handover is likely to fail. Such handover failures (HOFs) are clearly not desirable. The current RRC specification therefore provides various triggers, timers, and thresholds in order to adequately configure measurements, such that the need for handovers can be detected reliably, and sufficiently early.

In FIG. 2, the exemplified measurement report is triggered by a so called A3 event in the step 212 which, in short, corresponds to the scenario in which a neighbor cell is found to be an offset better than the current serving cell. It should be noted that there are multiple events that can trigger a report.

It may occur that a UE 102, 202 looses coverage to the cell that the UE 102, 202 is currently connected to. This could occur in a situation when a UE 102, 202 enters a fading dip, or that a handover was needed as described above, but the handover failed for one or another reason. This is particularly true if the "handover region" is very short. By constantly monitoring the radio link quality, e.g. on the physical layer as described in 3GPP TS 36.300, e.g. V11.4.0 (2013-01), TS 36.331, e.g. V11.2.0 (2013-01), and TS 36.133, e.g. V11.2.0 (2013-01), the UE 102, 202 itself is able to declare a radio link failure and autonomously start a RRC re-establishment procedure. If the re-establishment is successful, which depends, among other things, if the selected cell and the eNB 104, 108, 204, 208 controlling that cell was prepared to maintain the connection to the UE 102, 202, then the connection between the UE 102, 202 and the eNB 104, 108, 204, 208 can resume. A failure of a re-establishment means that the UE 102, 202 goes to RRC_IDLE and the connection is released. To continue a communication, a brand new RRC connection has then to be requested and established.

In the following, the features dual connectivity and RRC diversity are described.

Dual connectivity is a feature defined from the UE perspective wherein the UE may simultaneously receive and transmit to at least two different network points. The at least two network points may be connected to one another via a backhaul link such that a UE may be enabled to communicate with one of the network points via the other network point. Dual connectivity is one of the features that are being standardized within the umbrella work of small cell enhancements within 3GPP Release 12 (Rel-12).

Dual connectivity is defined for the case when the aggregated network points operate on the same or separate frequency. Each network point that the UE is aggregating may define a stand-alone cell or it may not define a stand-alone cell. In this respect, the term "stand-alone cell" may particularly denote that each network point, hence each cell, may represent a separate cell from a perspective of a UE. In contrast, network points not defining a stand-alone cell may be regarded from a perspective of a UE as one same cell. It is further foreseen that from the UE perspective the UE may apply some form of Time Division Multiplex (TDM) scheme between the different network points that the UE is aggregating. This implies that the communication on the physical layer to and from the different aggregated network points may not be truly simultaneous.

Dual connectivity as a feature bears many similarities with carrier aggregation and coordinated multi-point (CoMP). The main differentiating factor is that dual connectivity is designed considering a relaxed backhaul and less stringent requirements on synchronization requirements between the network points. This is in contrast to carrier aggregation and CoMP, wherein tight synchronization and a low-delay backhaul are assumed between connected network points.

Examples of features that dual connectivity will allow in the network are:

RRC diversity (e.g. handover (HO) command from source and/or target); in this respect, the term "RRC diversity" may particularly denote a scenario in which control signaling can be transmitted via at least two connections between a network and a UE;

Radio Link Failure (RLF) robustness (failure only when both links fail);

Decoupled uplink (UL)/downlink (DL) (UL to Low Power Node (LPN) for example with LPD corresponding to a small cell or a pico cell, DL from macro cell);

Aggregation of macro anchor carrier and LPN data booster(s);

Selective Handover (e.g., data from/to multiple nodes);

Hide UE mobility between smalls cells from Core Network (CN) with C-plane in macro cell; and Network Sharing (Operators might want to always keep the control plane and Voice Over IP (VoIP) terminated in their own macro, but may be willing to offload best effort traffic to a shared network).

FIG. 3 illustrates the feature of dual connectivity of a UE 302 to an anchor 304a and a booster 304b.

A UE 302 in dual connectivity maintains simultaneous connections 334a, 334b to anchor and booster nodes 304a, 304b. As the name implies, the anchor node 304a terminates the control plane connection towards the UE 302 and is thus the controlling node of the UE 302. The UE 302 also reads system information from the anchor 304a. In FIG. 3, the system information and a spatial availability thereof are indicated by a dashed circle. In addition to the anchor 304a, the UE 302 may be connected to one or several booster nodes 304b for added user plane support. In this respect, the term "booster" may denote that a performance of a UE in terms of its data peak rate may be improved, since user plane data may be additionally transmitted via the booster. To this end, a transmission frequency employed by the anchor may be different from a transmission frequency employed by the booster.

The anchor and booster roles are defined from a UE 302 point of view. This means that a node that acts as an anchor 304a to one UE 302 may act as booster 304b to another UE 302. Similarly, though the UE 302 reads the system information from the anchor node 304a, a node acting as a booster 304b to one UE 302, may or may not distribute system information to another UE 302.

FIG. 4 illustrates a control and user plane termination in an anchor node and a booster node. This protocol architecture may represent an exemplary protocol termination compliant with dual connectivity and RRC diversity. The protocol architecture shown in FIG. 4 is proposed as a way forward for realizing dual connectivity in LTE Rel-12 in deployments with relaxed backhaul requirements. In the user plane 436 a distributed Packet Data Convergence Protocol (PDCP)/Radio Link Control (RLC) approach is taken where the booster and anchor terminate the user planes 436 of their respective bearers, with a possibility to realize user plane aggregation via Multipath Transmission Control Protocol (MPTCP) which may offer a split of traffic to several connections. In the control plane 434, the RRC and Packet Data Convergence Protocol (PDCP) are centralized at the anchor, with a possibility to route RRC messages via the anchor, the booster, or even simultaneously at both links. For ease of completeness, "NAS" may represent a Non Access Stratum protocol layer, "RLC" may represent a Radio Resource Control protocol layer, "MAC" may represent Medium Access Control protocol layer, and "PHYS" may represent a Physical layer.

In a further exemplary protocol termination enabling dual connectivity and RRC diversity, RRC is terminated in the anchor node, and PDCP is available both for the anchor node and the booster node.

However, problems described in the following might occur.

A problem may relate to handover failures and radio link failures for scenarios in which a UE is connected to one network point, hence one cell. In the following, handover and radio link failure robustness is described.

The recent and rapid uptake of Mobile Broadband has led to a need for increasing the capacity of cellular networks. One solution to achieve such a capacity increase is to use denser networks consisting of several "layers" of cells with different "sizes": Macro cells ensure large coverage with cells encompassing large areas, while micro-, pico- and even femto-cells are deployed in hot-spot areas where there is a large demand for capacity. Those cells typically provide connectivity in a much smaller area, but by adding additional cells (and radio base-stations controlling those cells), capacity is increased as the new cells off-load the macro cells.

FIG. 5 illustrates a UE 502 moving out from a pico cell area of a pico cell 538 into macro cell area of a macro cell 540. A movement direction of the user equipment 502 is indicated by an arrow 542. This figure may illustrate a typical scenario for a handover of a UE 502.

The different "layers" of cells can be deployed on the same carrier (i.e. in a reuse-1 fashion in which all neighboring cells may use the same frequency), the small-cells could be deployed on a different carrier, and the different cells on the various layers could even be deployed using different technologies (e.g. 3G/High Speed Packet Access (HSPA) on the macro- and micro-layer, and LTE on the pico-layer as one non-exclusive example). In this respect, the term "layer" may particularly denote a higher abstraction level of a cell with respect to a transmission frequency or carrier employed in the cell.

There is currently a large interest for investigating the potential of such Heterogeneous Networks, and operators are interested in such deployments. However, it has also been found that such Heterogeneous Networks may result in an increased rate of handover failures, as briefly discussed above. One reason is that the handover region in Heterogeneous Networks may be very short, meaning that the handover might fail since the UE lost coverage to the source cell before the handover to a target cell could be completed. For example, when a UE leaves a pico-cell, it may happen that the coverage border of the pico is so sharp, that the UE fails to receive any handover command towards a macro before loosing coverage to the pico, see FIG. 5 or 6.

FIG. 6 illustrates a handover region of a pico/macro cell change versus a macro/macro cell change. A network comprises a pico cell 638, a marco cell 640a, and a further macro cell 640b. An abscissa 644 of the diagram may represent a Reference Signal Received Power (RSRP), and an ordinate 646 of the diagram may represent a distance. A curve 666 may represent the RSRP perceived by a UE from the macro cell 640a, a curve 668 may correspond to the RSRP perceived by a UE from the pico cell 638, and a curve 670 may represent the RSRP perceived by the UE from the another macro cell 640b. A handover region 672 from the macro cell 640a to the pico cell 638 and vice versa is small compared to a handover region 674 between the macro cells 640a, 640b.

Similar problems could occur when a UE connected to a macro cell suddenly enters a pico cell on the same carrier: It could now happen that the control channels of the pico cell interferes with the signals that the UE needs to receive from the macro cell in order to complete the handover, and the handover thus fails.

In order to investigate the consequences of increased handover failures and solutions to mitigate those, 3GPP is currently working on evaluations and technical solutions for amendments, as described in TR 36.839, e.g. V11.1.0 (2013-01).

In the following, key performance indication (KPI) degradation and a need for drive testing is described. In this respect, the term "key performance indication" may particularly denote information collected by a network, which information may relate to a performance characteristic of the network such that a corresponding managing network operator may accordingly adapt the network. For example, a KPI may relate to handover failures and may indicate information such as how often a handover may occur, in which area the handover may occur, a reason for the occurrence of the handover etc. The term "drive testing" may particularly denote a procedure in which dedicated testing device, e.g. a user equipment, may move through the network, e.g. may "drive around", and may test network characteristics related to e.g. connectivity. In one option, an entity, e.g. a software may be installed spatially fixed in the network and may collect corresponding information from user equipments in the network.

Today it is very difficult to determine if a KPI problem experienced at a certain location in a radio network is due to that a Cell does not receive UE transmission or if it is the UE that does not receive the cell transmission or both. The current typical way of trouble shooting is to make drive testing and collect both Cell traces with time stamped events/transmissions and UE trace with events/transmissions is collected from the UE's used for drive testing. Here, the term "trace" may refer to a collection of logged information.

In 3GPP efforts have been made to support that UE collect some information when experiencing problems with the connection or problems in getting access to the system and then when connectivity is established to the network (NW) at a later time when a connection is established the NW can ask the UE to transmit the collected information. The collected information has time stamp information based on an UE internal clock and also location information.

Drive testing and using specific UE's for drive testing may not always be able to discover intermittent faults or drive into locations where the problem actually occurs. If it is a UE vendor specific problem the UE used for drive testing may not have the same kind of fault as some of the UE's used by subscribers in the network. On top of that regular drive testing is typically very expensive. There is a large cost for collecting the data and also a cost when data is analyzed. The data analysis can be costly and difficult due to that drive testers need to collect all data on rather detailed level and hope that the intermittent fault appears and are captured in the data collected during drive testing amongst the large amount of data collected.

Assuming a system where a UE can be simultaneously connected to several cells, it is currently unclear how the UE shall evaluate radio link failures and how the system shall react upon these radio link failures or other connectivity issues of some of the maintained connections.

Moreover, KPI evaluation by the radio network for UEs experiencing radio link problems in certain locations at a certain time is problematic due to the degraded connectivity to the UE in these situations. With the current system, the evaluation cannot be done immediately after the fault and is usually based on reports or (costly) drive tests. An immediate adaption of the system possibly improving the KPIs is thus not possible.

SUMMARY

It is an object of the present invention to provide measures with which a network adaption of a mobile network in a case a degradation of a quality of a connection of at two connections between an access node of the mobile network and the terminal may be enabled in an improved way. It is a further object of the present invention to provide corresponding methods, a terminal, nodes, a mobile network, computer programs, and computer program products.

The objects above are solved by methods, a terminal, nodes, a mobile network, computer programs and computer program products according to the independent claims.

According to a first exemplary aspect, a method for adapting a mobile network is provided. A terminal is connected to a first access node of the mobile network via a first connection and to a second access node via a second connection. The first access node controls a data transmission for the terminal and the second access node assists in the data transmission for the terminal. The method comprises determining whether a quality of at least one of the first connection and the second connection is degraded, acquiring quality degradation information about the degradation of the quality of at least one of the first connection and the second connection based on the step of determining, and adapting the mobile network based on the step of acquiring.

According to a second exemplary aspect, a method for adapting a mobile network is provided. A terminal is connected to a first access node of the mobile network via a first connection and to a second access node via a second connection. The first access node controls a data transmission for the terminal and the second access node assists in the data transmission for the terminal. The method is performed by the terminal and comprises determining whether a quality of at least one of the first connection and the second connection is degraded, and acquiring quality degradation information about the degradation of the quality of at least one of the first connection and the second connection based on the step of determining particularly for adapting the mobile network.

According to a third exemplary aspect, a method for adapting a mobile network is provided. A terminal is connected to a first access node of the mobile network via a first connection and to a second access node via a second connection. The first access node controls a data transmission for the terminal and the second access node assists in the data transmission for the terminal. The method is performed by the first access node and comprises acquiring quality degradation information about a degradation of a quality of at least one of the first connection and the second connection, and adapting the mobile network based on the step of acquiring.

According to a fourth exemplary aspect, a method for adapting a mobile network is provided. A terminal is connected to a first access node of the mobile network via a first connection and to a second access node via a second connection. The first access node controls a data transmission for the terminal and the second access node assists in the data transmission for the terminal. The method is performed by the second access node and comprises adapting the mobile network based on a quality of at least one of the first connection and the second connection being degraded.

According to a fifth exemplary aspect, a terminal for adapting a mobile network is provided. The terminal is connected to a first access node of the mobile network via a first connection and to a second access node via a second connection. The first access node controls a data transmission for the terminal and the second access node assists in the data transmission for the terminal. The terminal comprises a determination unit adapted to determine whether a quality of at least one of the first connection and the second connection is degraded, and an acquiring unit adapted to acquire quality degradation information about the degradation of the quality of at least one of the first connection and the second connection based on the determination particularly for adapting the mobile network.

According to a sixth exemplary aspect, an access node for adapting a mobile network is provided. A terminal is connected to the access node of the mobile network via a connection and to another access node via another second connection. The access node controls a data transmission for the terminal and the another access node assists in the data transmission for the terminal. The access node comprises an acquiring unit adapted to acquire quality degradation information about a degradation of a quality of at least one of the first connection and the second connection, and an adapting unit adapted to adapt the mobile network based on the acquired quality degradation information.

According to a seventh exemplary aspect, an access node for adapting a mobile network is provided. A terminal is connected to the access node of the mobile network via a connection and to another access node via another connection. The another access node controls a data transmission for the terminal and the access node assists in the data transmission for the terminal. The access node comprises an adapting unit adapted to adapt the mobile network based on, particularly subsequent to, a quality of at least one of the connection and the another connection being degraded.

According to an eighth exemplary aspect, a mobile network is provided. The mobile network comprises a terminal according to the fifth exemplary aspect, a first access node according to the sixth exemplary aspect and a second access node according to seventh exemplary aspect.

According to a ninth exemplary aspect, a computer program is provided. The computer program, when being executed by a processor, is adapted to carry out or control a method for adapting a mobile network according to any one of the first, second, third or fourth exemplary aspect.

According to a tenth exemplary aspect, a computer program product is provided. The computer program product comprises program code to be executed by at least one processor, thereby causing the at least one processor to execute a method according to any one of the first, second, third or fourth exemplary aspect.

The foregoing and other objects, features and advantages will become more apparent in the following detailed description of the present disclosure as illustrated in the accompanying drawings.

DETAILED DESCRIPTION

Figure 1A:
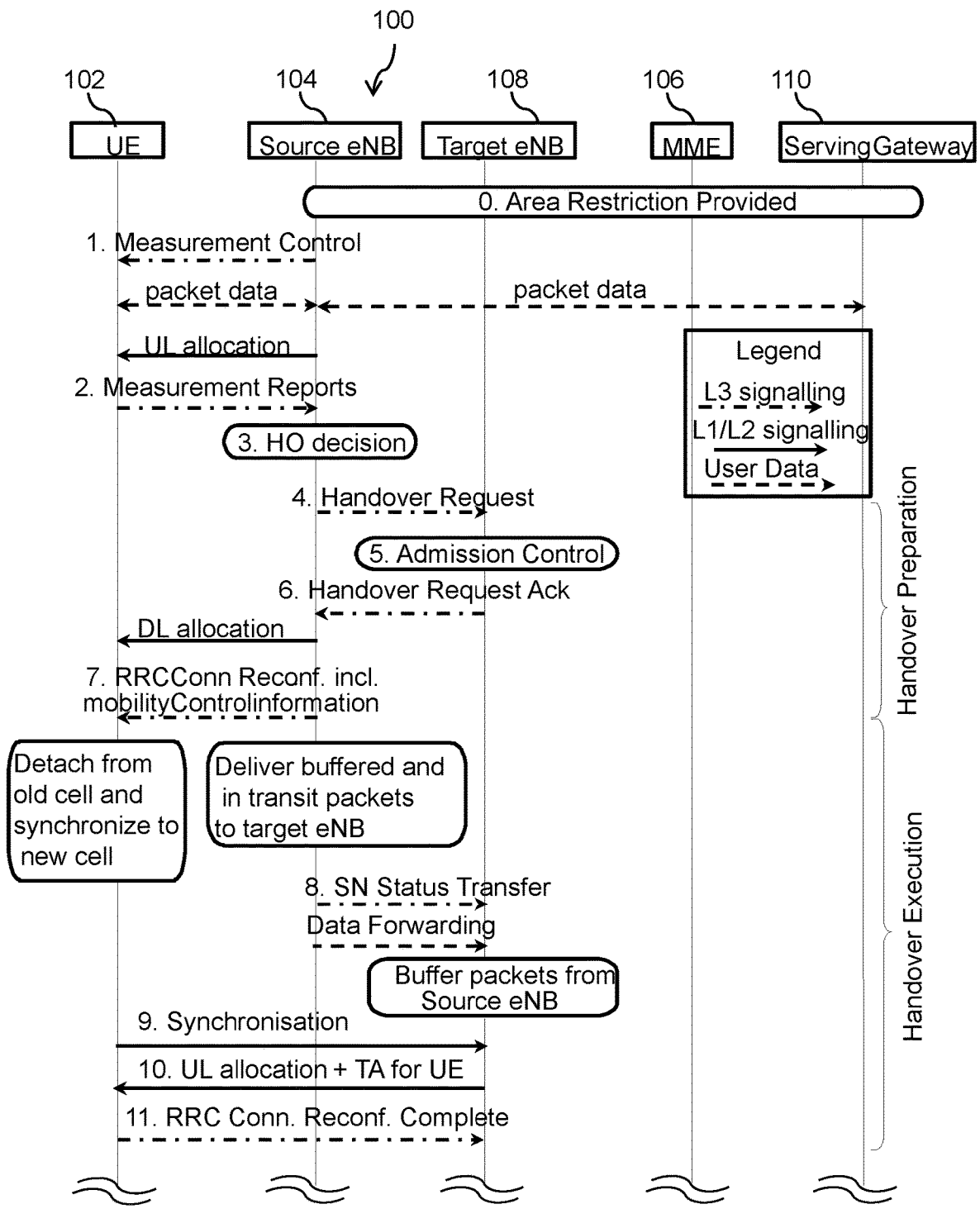
FIGS. 1A and 1B are flow diagrams illustrating a signaling exchange for a handover procedure.

According to the exemplary aspects, in a data transmission for a terminal, data may be transmitted from a first access node to the terminal via a first connection and data duplicates may be sent from a second access node to the terminal via a second connection. Here, the term "data transmission" may relate to transmitting signaling data and/or payload data in an uplink direction from the terminal to the mobile network and/or in a downlink direction from the mobile network to the terminal. In order to enable the terminal to receive duplicate data from the first access node and the second access node, the first access node may have duplicated the respective data and may have sent the data duplicates to the second access node via a backhaul connection between the first access node and second access node. The first connection and the second connection may be independent from one another, and may comprise respective radio bearers to be established related to the data transmission.

In such a communication scenario, the first access node may control the data transmission for the terminal and the second access node may assist in the data transmission for the terminal. In this respect, the term "the first access node controlling a data transmission of the terminal" may particularly denote to a control, by the first access node, of resource allocation for uplink and/or downlink data transmission for the terminal and/or a connectivity state of the terminal. Hence, the first access node can be also referred to as an anchor node for the data transmission of the terminal, for example, always being employed for the data transmission for the terminal. Such a communication scenario may be accomplished in LTE by terminating a protocol related to the allocation of resources via the air interface between the terminal and the first access node, particularly a RRC protocol, in the first access node. Alternatively, a PDCP protocol may be terminated in the first access node. In particular, the term "the second access node assisting in the data transmission for the terminal" may particularly denote that the second access node may be free of a capability of controlling the data transmission to the terminal, but may relay the uplink and/or downlink data transmission between the access node and the terminal. In particular, the second access node can be referred to as a booster node for the data transmission of the terminal, for example, being employed for the data transmission for the terminal as relay node. Hence, as explained above, information sent between the first access node and the terminal may be duplicatedly sent between the first access node and the terminal via the second access node.

In this communication scenario, at least one of the first and second connections may comprise a degraded quality. In order to accomplish a suitable mobile network adaption in case of such a quality degradation, a quality of the first connection and/or the second connection may be determined, respective quality degradation information indicating that a quality of the first connection and/or the second connection may be degraded may be acquired based on the step of determining, and, based on the step of acquiring, the mobile network may be adapted. In this respect, the term "acquiring information" may relate to an entity obtaining information by means of internally determining information and/or obtaining information by means of receiving information over the mobile network.

Accordingly, connectivity degradation of a connectivity between the terminal and the first access node and/or the second access node may be handled in an efficient, easy and fast way. An overall system performance may be therefore improved.

Figure 1B:
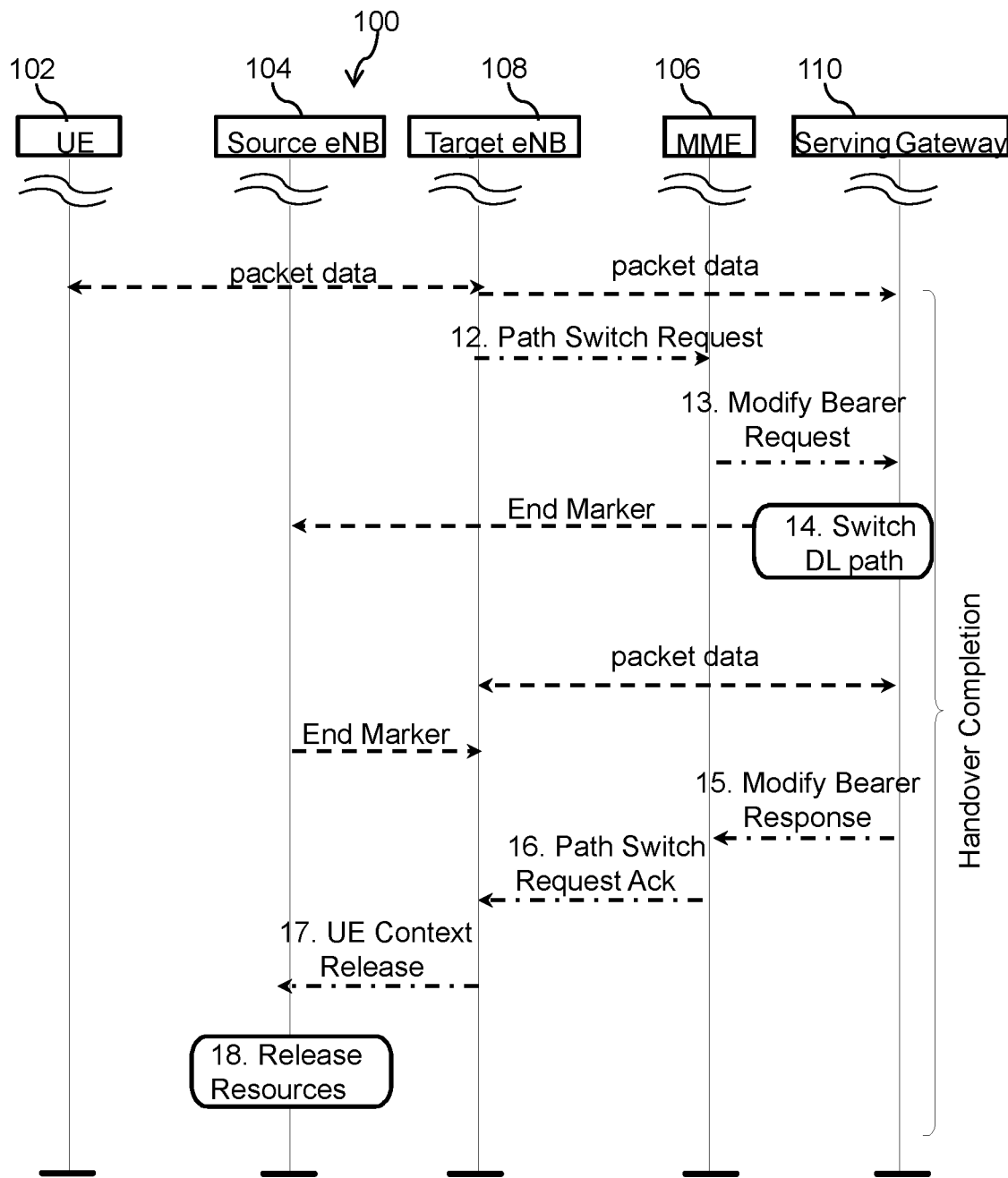
Figure 2:
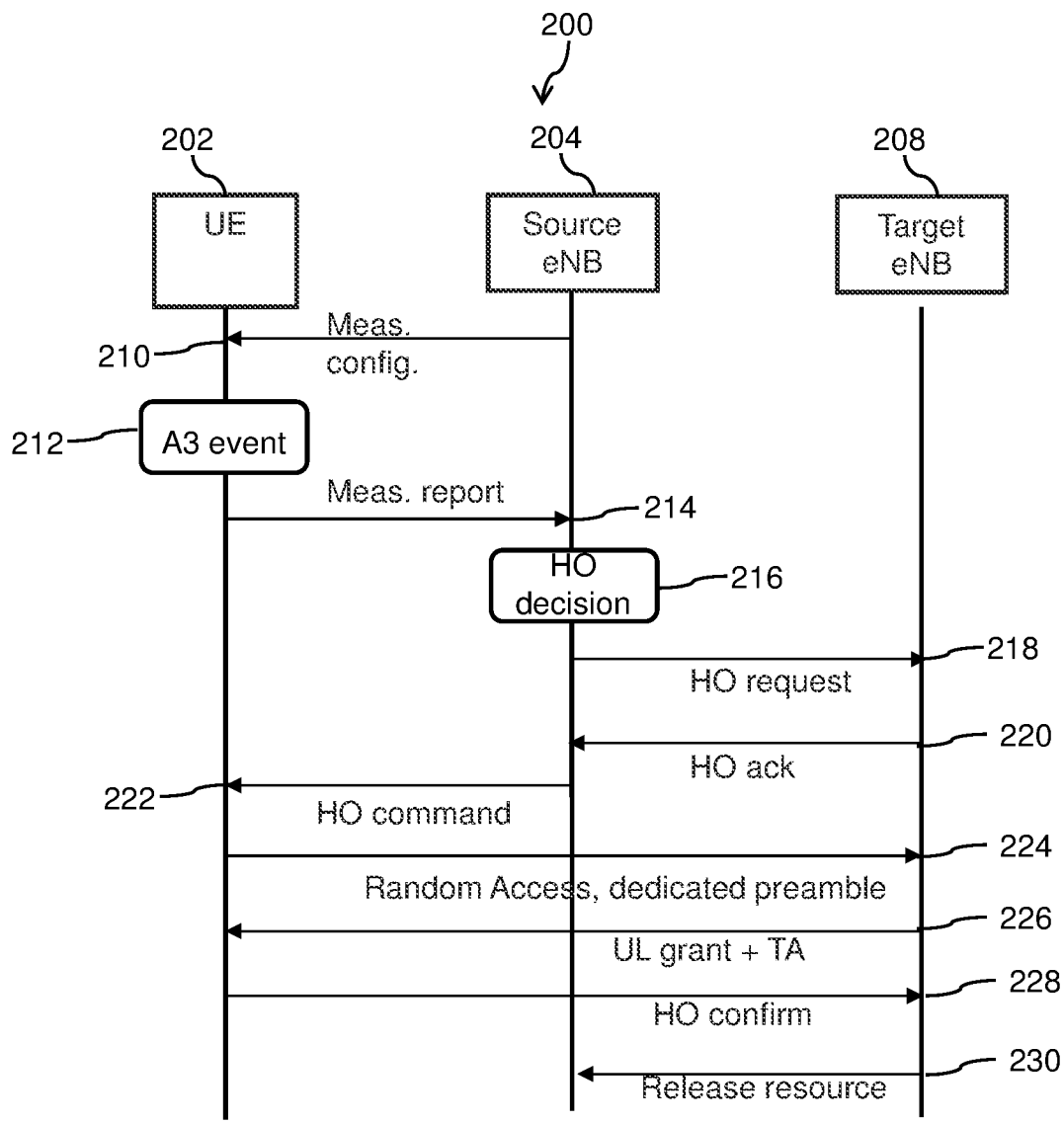
FIG. 2 is a flow diagram illustrating a signaling exchange for a handover procedure.
Figure 3:
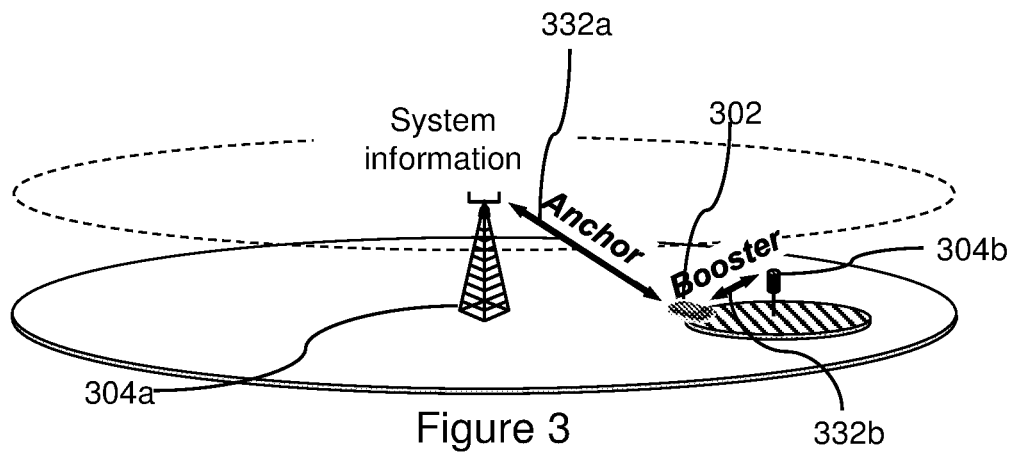
FIG. 3 is a block diagram illustrating a mobile network used in connection with dual connectivity of a terminal.

With reference to embodiments explained in this disclosure, the first access node may be referred in described embodiments as "Source eNB" and the first connection may refer to an "anchor" connection 332a in FIG. 3. The second access node may be referenced in the described embodiments as "Assisting eNB", and the second connection may refer to the "booster" connection 332b in FIG. 3. It is noted that the target eNB 108, 208 described in connection with FIGS. 1A, 1B and 2 may also represent an access node adapted to control the data transmission for the terminal depending on being a transmission controlling access node or not.

Next, embodiments related to the method according to first exemplary aspect will be described. These embodiments also apply to the methods according to second, third and fourth exemplary aspects, the terminal according to the fifth exemplary aspect, the first access node according to sixth exemplary aspect, the second access node according to the seventh exemplary aspect, the mobile network according to the eighth exemplary aspect, the computer program according to the ninth exemplary aspect and the computer program product according to the tenth exemplary aspect.

The step of adapting the mobile network may comprise adapting at least one connection between the terminal and the mobile network based on the step of determining. In particular, the terminal may be part of the mobile network.

With respect to the step of adapting, in one variant of the method, the step of determining may result in the first connection comprising a degraded quality, and the step of adapting may comprise maintaining the connection not comprising the degraded quality. In this case, the connection not comprising the degraded quality may be the second connection.

Alternatively or additionally, the step of determining may result in the first connection comprising a degraded quality, and the step of adapting may comprise handing, by the first access node, the terminal over from the first access node to the second access node and disconnecting the first connection. For example, the first access node may initiate the handover of the terminal by sending a handover request to the second access node. The second access node may then forward or relay the handover request to the terminal. The first access node may stop controlling the data transmission of the terminal. In LTE the latter performed step may relate to stop RRC diversity. In this respect, RRC diversity employed in the first access node may relate to a sending of data directly to the terminal and to a sending of duplicates of the data, which may be sent by the first access node to the terminal, to the second access node for relaying them by the second access node to the terminal. The data may comprise control signaling. Accordingly, stopping RRC diversity may refer to not duplicating the sent data anymore, thus maintaining only the direct connection to the terminal to keep legacy functionality. This legacy connection may be handed over to the second access node. Or in other words, particularly with respect to LTE, the latter may relate to stopping RRC signal duplication and forwarding to the second access node. In the above case the first access node may control the disconnection of the terminal, for example by sending a RRC reconfiguration request message to the terminal via the second access node. In the above case, the step of adapting may further comprise transferring, by the first access node, control capabilities for controlling the data transmission of the terminal from the first access node to the second access node. For example, a signaling bearer between the first access node and the terminal may be transferred to the second access node, which bearer may transport a control signaling. In particular, the latter mentioned embodiments may be described later with reference to steps 8, 9, 11 and a resulting step or state 999 of FIG. 9.

In another further variant of the method, the step of determining may result in the second connection comprising a degraded quality, and the step of adapting comprise requesting, by the first access node, to disconnect the second connection, and stopping to employ the second access node for the data transmission for the terminal. In particular, the step of stopping to employ the second access node for the data transmission may comprise stopping to duplicate the data sent from the first access node to the terminal and stopping to send the duplicated data to the second access node. In particular, this step may be embodied as stopping RRC diversity, relating to not duplicating the data or messages anymore which may be to be sent to the second access node. A message related to the disconnect request may be embodied as a Stop RRC relaying message explained with reference to FIG. 8. Thus only a direct connection from the first access node to the UE may be maintained, the latter referring to as legacy functionality of the first access node of the mobile network. This embodiment may be described later with reference to FIG. 8.

With regard to the step of acquiring, in a first variant of the method, the step of determining may result in one connection of the first connection and the second connection comprising a degraded quality, and the step of acquiring may comprise sending, by the terminal, the quality degradation information to the access node of the first access node and the second access node whose connection to the terminal might not comprise the degraded quality. In this case the quality degradation information may be sent via the connection not comprising the degraded quality. For example, the quality degradation information may be sent to the first access node, if the second connection may have failed, as will be explained with reference to FIG. 8. The quality degradation information may be sent to the second access node, if the first connection may have failed, and may be relayed or forwarded by the second access node to the first access node, as may be explained with reference to FIG. 9.

In another variant, the step of determining may result in one connection of the first connection and the second connection comprising a degraded quality, and the step of acquiring may comprise sending, by the terminal, the quality degradation information to the access node of the first access node and the second access node whose connection to the terminal may comprise the degraded quality. In this case the quality degradation information may be sent via the connection comprising the degraded quality and/or may be sent via a further connection between the terminal and the access node. This further connection may be different from the first and second connection. This measure may beneficially enable that the terminal may inform the access node whose connection with the terminal has been identified to be degraded in a transmission direction from the access node to the terminal without a necessity of involving the other access node. The access node may then initiate an adaption of the mobile network without unnecessary delay. It may be assumed for this measure that the connection in a transmission direction from the terminal to the access node may comprise a sufficient high quality for successfully transmitting the quality degradation information.

The connection comprising the degraded quality may have failed. In this case the quality degradation information may comprise or may be embodied as a failure notification indication, particularly a RLF warning indication. The failure notification indication may represent an individual indication, particularly included in a conventional message or in a new type message, or may be a specific type of message.

The quality degradation information may comprise or may be embodied as at least one information of the following kind of information. Information according to a first option may comprise or may be embodied as cell identification indication indicative of an identification of an area, particularly a cell, being served by the access node associated with the failed connection, particularly an PCell Identification (ID), a cell global ID, a physical cell ID, or a carrier frequency of the cell. Information according to a second option may comprise or may be embodied as information about measurement results obtained for the area served by the access node associated with the failed connection and obtained for a previous time period. Information according to a third option may comprise or may be embodied as information about a measurement result obtained for an area, particularly a cell, served by the access node associated with the not failed connection and obtained for a previous time period. Information according to fourth option may comprise or may be embodied as information about a measurement result obtained for at least one further area, particularly a further cell, served by a further access node distinct from the first access node and second access node and obtained for a previous time period, particularly an identifier for the measurement. Information according to a fifth option may comprise or may be embodied as a connection indication indicative of the failed connection. Information according to a sixth option may comprise or may be embodied as a timer of the failure of the failed connection. Information according to a seventh option may comprise or may be embodied as a failure reason.

In such a case the failure reason may comprise at least one of the following kind of failure reasons. In a first option, the failure reason may comprise an expiration of a timer with the timer being started after a predetermined number of counter fulfillments of a condition and the timer being stopped after a predetermined number of counter fulfillments of another condition. For example the latter may correspond to an "out of sync" failure in LTE which may refer to a RLF timer expiry. Another failure reason may comprise a maximum of scheduling requests having been sent over the respective connection particularly without receiving a response. For example the latter may correspond in LTE to a maximum number of scheduling requests having been reached. A further failure reason may comprise a maximum of retransmission of data having been sent by the terminal over the respective connection. For example the latter may correspond in LTE to a maximum number of RLC retransmissions having been reached. In case of RLC retransmissions, the UE may retransmit data, if no reply may be received until a maximum number of retransmissions may be reached. A further failure reason may comprise a maximum of unsuccessful random access attempts having been sent by the terminal over the respective connection without receiving a data transmission over the respective connection. For example the latter may correspond in LTE to a Random Access Channel (RACH) failure.

The at least one information mentioned above may be sent together with the failure notification indication in one message or may be sent subsequent to the sent failure notification indication for the step of acquiring.

Respecting the step of determining, in a first variant of the method, the step of determining may be performed by the terminal and may comprise evaluating the quality of the first connection and evaluating the quality of the second connection. In this case the step of evaluating of the quality of the first connection and the step of evaluating the quality of the second connection may be performed independently of one another. Additionally or alternatively, the respective step of evaluating comprises evaluating a synchronization of the terminal with the respective access node with respect to the data transmission over the respective connection. In particular, a degradation of the quality of the respective connection may be determined, if the terminal may be not suitably synchronized for the data transmission over the respective connection. In particular, the determined degradation of the quality of the connection may correspond to a connection failure.

In a further variant of the method, the step of determining may comprise, particularly for each of the first and second connections, using a timer in the terminal and a counter in the terminal. The counter may be associated with a fulfillment of a condition, and a degradation of the quality of the respective connection may be determined, if the timer may expire with the timer being started after a predetermined number of the counter fulfillments of the condition, and the timer being stopped after a predetermined number of counter fulfillments of another condition. In particular, the timer may correspond to the T310 timer and the counter may correspond to the constant N310. In particular, the same or different type of timers and/or counters can be employed for the first and second connections.

In a further variant, the step of determining comprises, particularly for each of the first and second connections, using a timer in the terminal and counters in the terminal, each of the counters being associated with a fulfillment of a condition, wherein a degradation of the quality of the respective connection may be determined, if the timer may expire, the timer being started after a predetermined number of the counter fulfillments of the condition, and the timer being stopped after a predetermined number of another counter fulfillments of another condition. In particular, the timer may correspond to the T310 timer and the counters may correspond to the counters or constants N310, N311. In particular, the same or different type of timers and/or counters can be employed for the first and second connections.

With respect to the above described embodiments, the timer T310 and the counter N310, 311 may represent a legacy timer and a legacy counter, respectively. The counter N310 may count condition fulfilments, in order to start the timer T310. Such condition fulfillment may relate to a condition whether a Signal to Interference and Noise Ratio (SINR) perceived by the terminal may be below a threshold. The counter N311 may count condition fulfilments, in order to stop the timer T310. Such condition fulfillment may relate to a condition whether the SINR perceived by the terminal may be above a further threshold. Hence, the timer T310 may be started after the counter N310 may have counted a predetermined number of condition fulfillments of the condition associated with the counter N310, and the timer T310 may stop after a predetermined number of condition fulfillments of the condition associated with the counter N311 have been counted. A degraded quality is detected, if the timer T310 may expire and the predetermined number of condition fulfillments of the condition associated with the counter N311 might have not been counted.

The respective step of evaluating described above may comprise evaluating whether a maximum of scheduling requests may have been sent over the respective connection. Additionally or alternatively, the respective step of evaluating may comprise evaluating whether a maximum of retransmission of data may have been sent by the terminal over the respective connection. Additionally or alternatively, the respective step of evaluating may comprise evaluating whether a maximum of unsuccessful random access attempts may have been sent by the terminal over the respective connection without receiving a data transmission over the respective connection.

The connection comprising the degraded quality might have not failed.

In such a case the step of determining may result in the first connection comprising the degraded quality and the second connection not comprising a degraded quality, and the step of adapting may comprise switching a functionality of the first access node and the second access node with respect to controlling the data transmission for the terminal. Hence, the first access node may turn into a transmission assisting access node and the second access node may turn into a transmission controlling access node.

In this case the quality degradation information may comprise or may be embodied as a channel quality indication, particularly a Chanel Quality Indication report.

The step of acquiring may comprise sending by one access node of the first access node and the second access node to the other access of the first access node and the second access node the quality degradation information. For example, the step of determining may be performed by the second access node which may monitor a parameter associated with the channel quality information and/or may determine a value of the parameter.

With regard to the step of adapting, in another variant of the method, the step of determining may also result in the first connection and the second connection may have failed, and the step of adapting may comprise establishing a further connection between the terminal and a further access node of the mobile network. In accordance with this embodiment, the step of acquiring may be performed by the terminal, and/or the step of establishing may be initiated by the terminal. The further access node may be distinct from the first access node and the second access node or may be one of the first and second access nodes. Hence, the first connection and/or the second connection may be re-established.

Particularly in the later mentioned case in which the step of determining may result in the first connection and the second connection having failed, the step of acquiring may comprise sending, by the terminal, one or more connection failure reports, particularly radio link failure reports, to the further access node of the mobile network. The one or more connection failure reports may comprise information about the first and/or second connection or about all connections of the terminal. The information may relate to the connection failure of the particular connection or connections. For example, one connection failure report may be sent from the terminal in which the information about the first and/or second connection may be included. Alternatively, at least two connection failure reports may be sent by the terminal, in which information about the connection failure of specific connections may be included. The connection failure report may be sent after the terminal having successfully established a connection to the further access node.

With respect to the step of acquiring, in another variant of the method, the method may further comprise determining at least one key performance indication for the mobile network, and the step of adapting may comprise adapting at least one system setting of the mobile network based on the at least one key performance indication. The step of adapting of the system settings may be alternatively or additionally based on quality degradation information obtained, particularly sent in a RLF indication or RLF reports. An objective of this adaption may be the improvement of one of the key performance indicators in the network. In this respect, the system setting may relate to a characteristic of the first and/or second access node or may relate to a characteristic of a further access node of the mobile network. The above described embodiments for adapting the mobile network may describe an immediate or ad hoc adaption of the mobile network, and this embodiment related to the adaption of the system setting may describe an overall adaption of the mobile network on an intermediate or long term time scale.

Particularly in relation to the later mentioned network adaption, the step of determining may be performed by the terminal and the step of acquiring may be performed by the terminal and an access node of the first access node and the second access node. The method may comprise, acquiring, by the access node, further quality degradation information indicating a quality of the connection between the terminal and the access node being degraded. The step of adapting may be performed based on the acquired quality degradation information and the determined further quality degradation information. The further quality degradation information may relate to whether a maximum number of resynchronization attempts performed by the access node may have been reached, whether a maximum number of scheduling requests sent by the access node may have been reached and/or whether a maximum of number of RLC retransmissions may have been reached by the access node. In order to correctly combine the quality degradation information and the further quality degradation information, each of the latter two information may be associated with a corresponding time stamp.

In such an embodiment, the terminal may determines and send a RLF warning or a CQI report to the access node. The access node may also determine internal connection quality and then may decide which network adaption to perform with respect to quality of a downlink and/or uplink direction of the connection being degraded. This adaption may relate to a long term adaption described above.

With respect to the method according to the second exemplary aspect, quality degradation information embodied as a RLF indication may be embodied as or transmitted in a RRC message. Since RRC may be terminated in the first access node, i.e. RRC messages from the terminal to the second access node may always terminate in the first access node. Quality degradation information embodied as a CQI report and being sent to the second access node may not be automatically forwarded to the first access node, but as explained above the second access node may be enabled to perform such a step. The first access node may be therefore enabled to perform the step of adapting based on the acquired quality degradation information.

With respect to the method according to the third exemplary aspect, the second access node may, in one option described later with reference to FIG. 8, adapt the mobile network by stopping RRC relaying. In a further option described later with reference to FIG. 9, the second access node may acquire a RLF indication, and may adapt the mobile network by upgrading to the first access node, and may optionally forward the RLF indication to the first access node. In a third option described later in connection with the CQI report, the second access node may receive a CQI report and may adapt the mobile network, and may optionally forward the CQI report to first access node.

In the following with reference to FIGS. 7 to 12, further embodiments will be described in more detail within the context of LTE. It is noted that the terms "terminal" and "user equipment" may be used in an interchangeable way throughout this application. One or more embodiments are based on the assumption that the UE can communicate independently via two maintained connections. To provide radio link failure (RLF) diversity as well, the UE shall trigger the standardized RLF procedure only if both links are out-of-sync. In this respect, the term "out-of sync" may particularly denote that an user equipment may have lost synchronization to an access node in that the user equipment may not be able to decode synchronization information in terms of e.g. reference signals properly. If only one of the maintained connections fails, however, a different UE behavior must be enforced. With the embodiments the UE is able to inform the involved eNBs with the help of a new RRC RLF warning message about the RLF of one of the links, and the eNBs are able to quickly react upon this information by stopping the RRC diversity connection and/or handing over the UE completely to one of the involved eNBs. The eNB may also decide to move potential bearers mapped over the failed link to another link.

Figure 7:
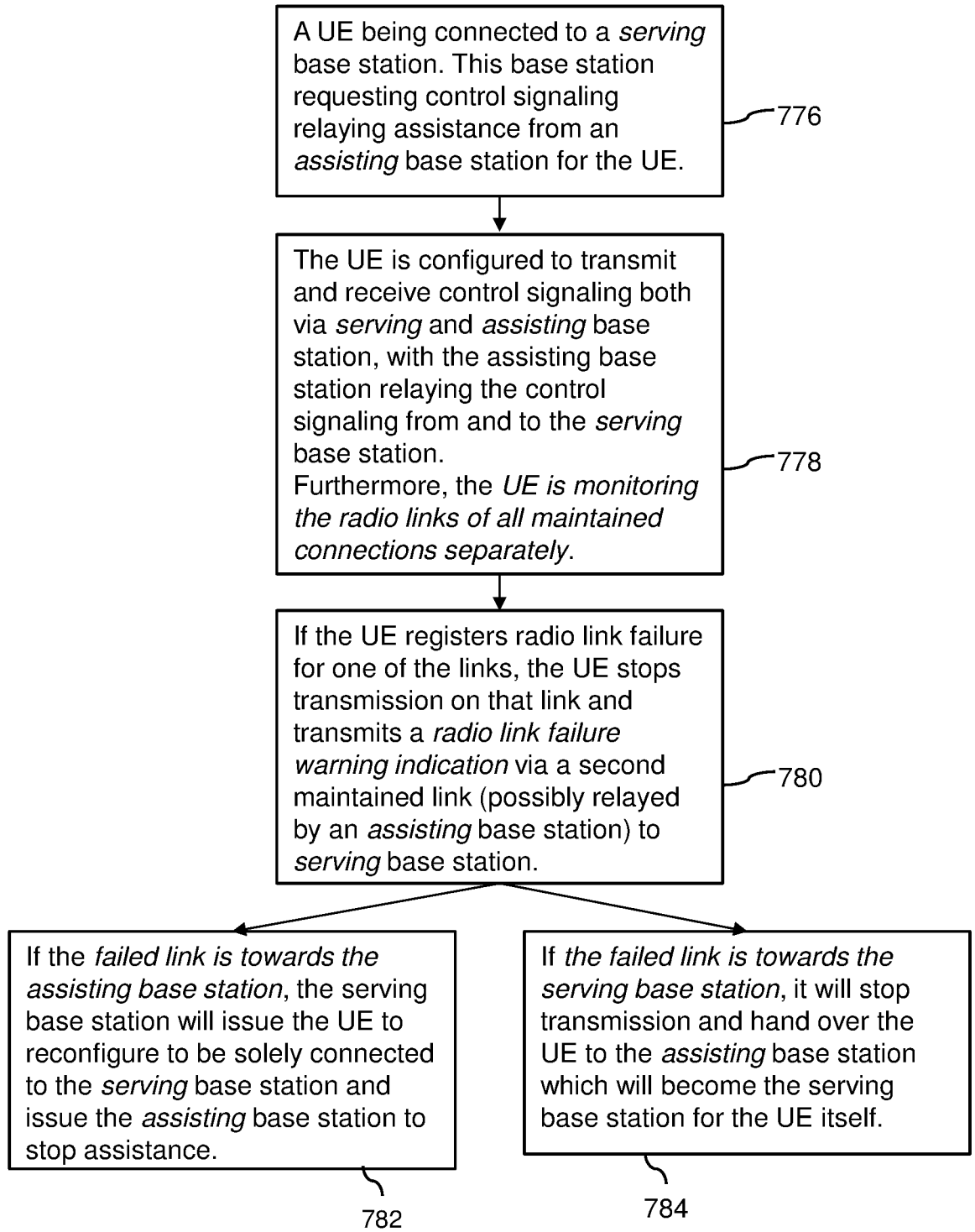
FIG. 7 is a flow chart illustrating a method for adapting a mobile network according to an embodiment.

FIG. 7 illustrates steps of a method according to an embodiment. A related communication scenario comprises an user equipment UE, a first access node called a serving base station, and a second access node called an assisting base station. According to a first step 776, the user equipment is connected to the serving base station. This base station may request control signaling relaying assistance from an assisting base station for the UE. In a further step 778, the UE is configured to transmit and receive control signaling both via the serving base station and the assisting base station with the assisting base station relaying the control signaling from and to the serving base station, respectively. Further, the UE may monitor the radio links of all maintained connections separately. In a further step 780, if the UE registers or detects a radio link failure for one of the links, the UE may stop transmission on that link and may transmit a radio link failure warning indication via a second maintained link, possibly relayed by the assisting base station, to the serving base station. In a step 782 performed according to a first option of the method, if the failed link may be towards the assisting base station, the serving base station may issue the UE to reconfigure to be solely connected to the serving base station, and may issue the assisting base station to stop assistance. Alternatively, in a step 784 performed according to a second option of the method, if the failed link is towards the serving base station, the serving base station may stop transmission and may handover the UE to the assisting base station which may become the serving base station for the UE itself.

Moreover, with the information obtained from the RLF-warning of one link and the information of another maintained connection E-UTRAN is quickly able to combine these information, learn about UE RLF failure reasons, their statistics and can apply necessary adaptations.

Embodiments are based on the assumption that the UE can communicate independently via two maintained connections. To provide radio link failure (RLF) diversity as well, the UE shall trigger the standardized RLF procedure only if both links are out-of-sync. If only one of the maintained connections fails, however, a different UE behavior must be enforced as explained in the following.

In the following, procedures according to embodiments are described in more detail.

Figure 8:
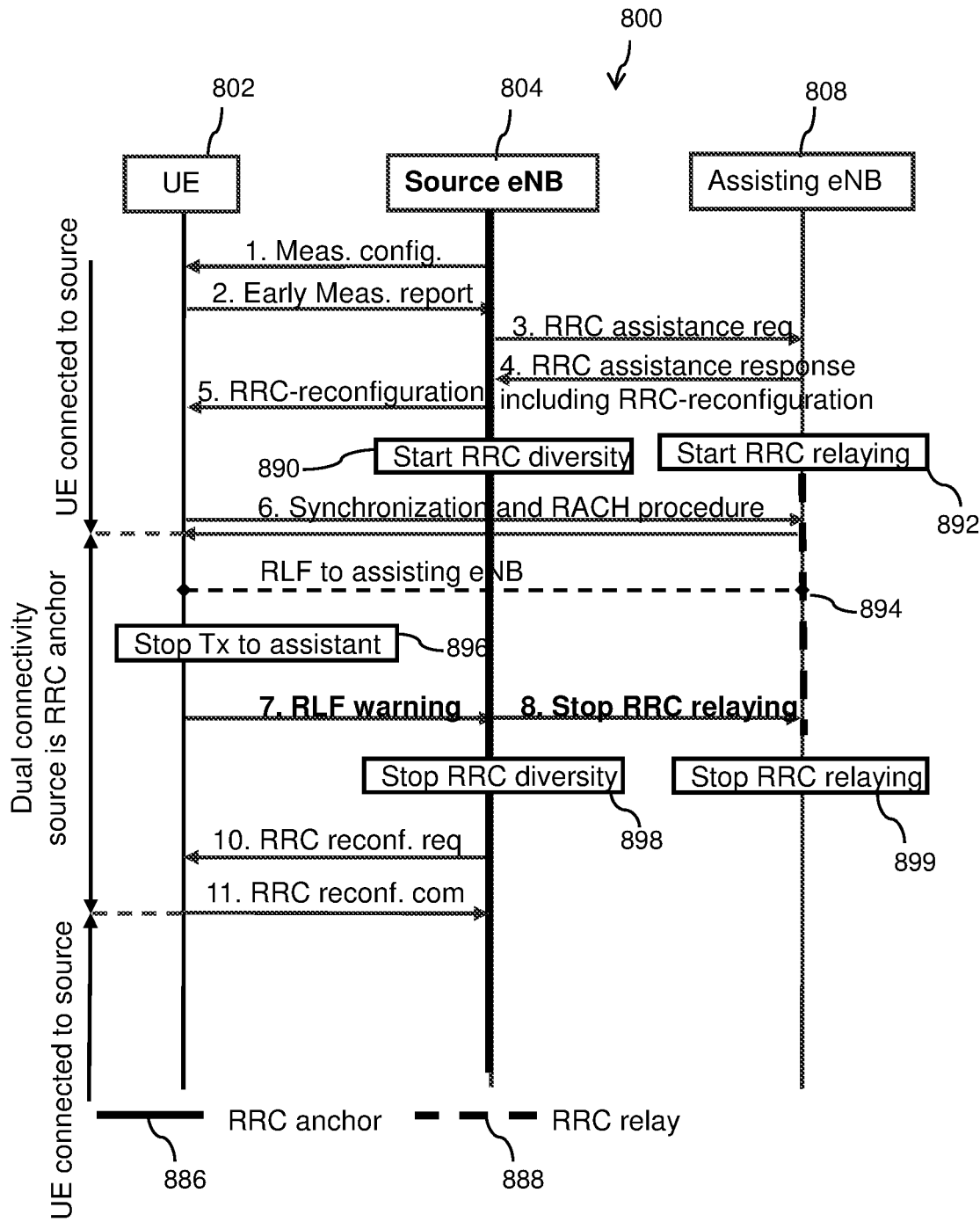
FIG. 8 is a flow diagram illustrating a method for adapting a mobile network according to another embodiment.
Figure 9:
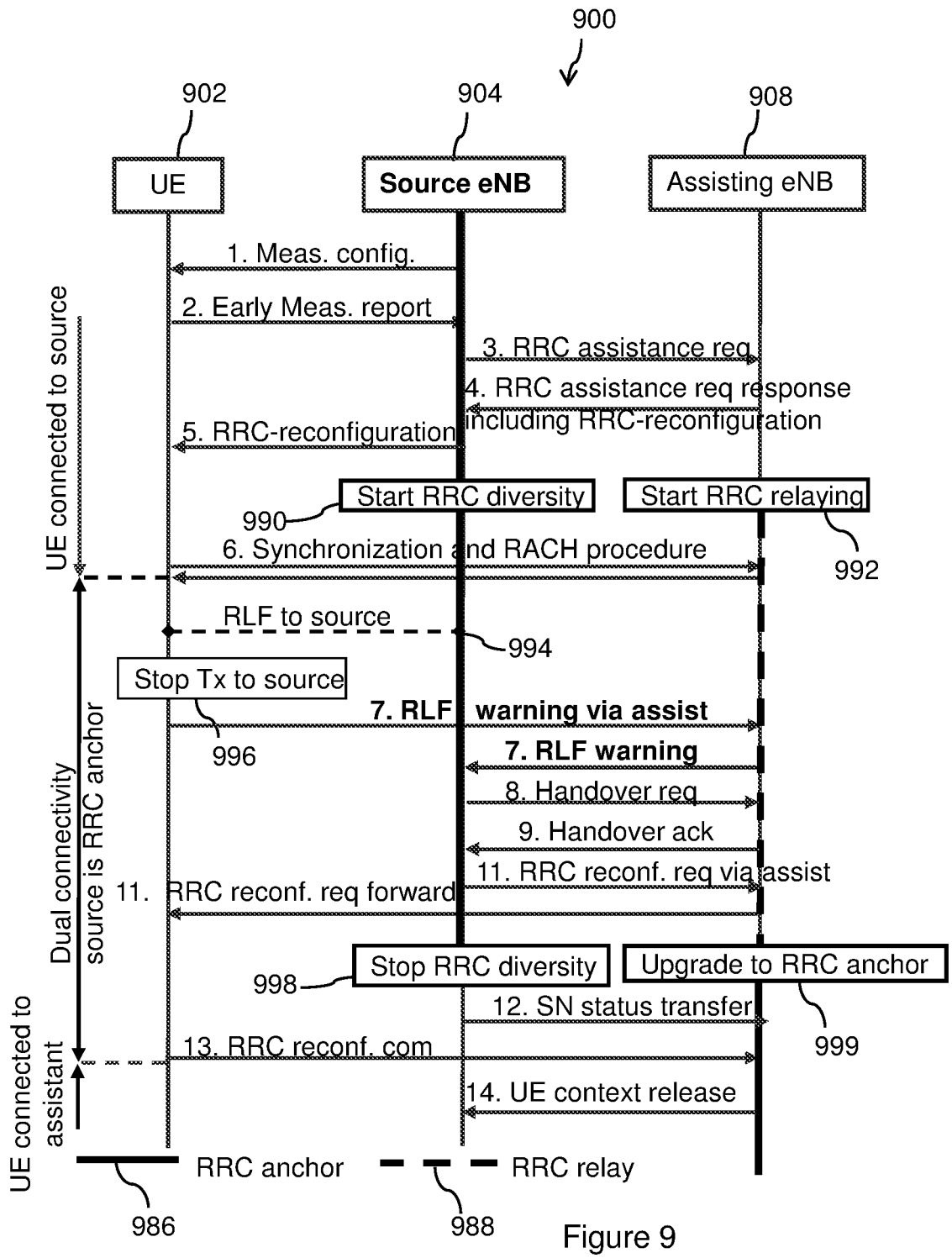
FIG. 9 is a flow diagram illustrating a method for adapting a mobile network according to another embodiment.

In FIG. 8 and FIG. 9 the signaling involved in the setup of the RRC connection as well as the reaction upon RLF of one of the links is described. In FIG. 8, a mobile network 800 comprises an user equipment 802, a source eNodeB 804, and an assisting eNodeB 808. In FIG. 9, a mobile network 900 comprises an user equipment 902, a source eNodeB 904, and an assisting eNodeB 908. Steps in FIGS. 8, 9 are labelled by integer numbers. RRC anchor functionality of the source and target eNodeBs 804, 904, 908 is indicated by a bold solid line and is referenced by a reference numeral 886, 986. RRC relay capability of the assisting eNodeB 808, 908 is indicated in FIGS. 8, 9 by a bold dashed line and is referenced by a reference numeral 888, 988.

According to FIGS. 8, 9, in a step 1, a measurement configuration is sent from the source eNodeB 804, 904 to the user equipment 802, 902. In a step 2, an early measurement report is sent from the UE 802, 902 to the source eNodeB 804, 904. The early measurement report may be issued in response to a A3 event explained with reference to FIG. 2. In a subsequent step 3, an RRC assistance request is sent from the source eNodeB 804, 904 to the assisting eNodeB 808, 908. In a next step 4, an RRC assistance response including RRC reconfiguration information is sent from the assisting eNodeB 808, 908 to the source eNodeB 804, 904. In a next step 5, the RRC-reconfiguration information is sent from the assisting eNodeB 808, 908 to the source eNodeB 804, 904. A RRC-reconfiguration is sent from the source eNodeB 804, 904 to the UE 802, 902 in a step 5. In a step 890, 990, the source eNodeB 804, 904 starts RRC diversity. In a step 892, 982, the assisting eNodeB 808, 908 starts RRC relaying. In a next step 6, the UE 802, 902 sends a synchronization and RACH procedure request towards the assisting eNodeB 808, which accordingly sends a response to the UE 802, 902.

Hence, the UE 802, 902 is first configured with a measurement configuration (1) issuing an early measurement report (2). This measurement may relate to a source cell, assisting cell or different cells. Upon reception of this measurement report in the source eNB 804, 904 it will (if required) request an RRC diversity peering (3) with the assisting eNB 808, 908, which acknowledges this request (4) and includes the RRC-reconfiguration for the UE 802, 902 to setup RRC diversity transmission and reception, which the source eNB 804, 904 will forward to the UE 802, 902 (5). At this point the source eNB 804, 904 will go into RRC diversity state where RRC messages are transmitted and received to the UE 802, 902 directly and additionally send to/received from the assisting eNB 808, 908 for relaying to/from the UE 802, 902. The UE 802, 902 will start a RACH procedure towards the assisting eNB 808, 908 to become synchronized to it (6).

In FIG. 8 the reaction procedure for RLF to the assisting cell is described, while in FIG. 9 the procedure for RLF to the source cell is described.

In the following, a reaction to the assisting eNB 808 out-of-sync is described. As illustrated in FIG. 8, a RLF between the UE 802 and the assisting eNodeB 808 occurs in a step 884. In a step 896, the UE 802 stops transmitting to the assisting eNodeB 808. In a step 7, the UE 802 sends a RLF warning to the source eNodeB 804, which in turn stops in a step 8 RRC relaying to the assisting eNodeB 808. In steps 898, 899, the source eNodeB 804 stops RRC diversity and the assisting eNodeB 808 stops RRC relaying, respectively. In steps 10 and 11, the source eNodeB 804 sends a RRC reconfiguration request to the UE 802 and the UE 802 sends a RRC reconfiguration command to the source eNodeB 804, respectively. The UE 802 is connected to the source eNodeB 804 in a communication up to the step 6. In a communication between the UE receiving a response to the synchronization and the RACH procedure in the step 6, and the occurrence of the step 11, dual connectivity for the UE 802 is performed, wherein the source eNodeB 804 may represent the RRC anchor node. From the step 11 onwards, the UE 802 is connected to the source eNodeB 804, but not to the assisting eNodeB 808. Afterwards, the source eNB 804 may send a path switch request to a core network node.

Hence, after the UE 802 has measured a Layer-3 RLF (i.e. timer T310 expired) towards the assisting cell (FIG. 8), it will stop the transmission on this link and trigger the transmission of the (7) RLF warning message, as further described below, towards the source eNB 804. The source eNB 804 will send an indication to the assisting eNB 808 to stop the RRC relaying functionality (8) for the UE 802, since it is aware of the UE 802 having triggered RLF to the assisting eNB 808. This way the assisting eNB 808 is informed about the radio link failure to the UE 802 immediately, which would not have been possible with the currently standardized solution, where this state could only be estimated based on timers etc. At this point RRC diversity should be deactivated in both source eNB 804 and assisting eNB 808. Only the connection between source eNB 804 and UE 802 should be maintained, thus the UE 802 is configured to stop RRC diversity, but maintain the connection to the UE 802. The source eNB 804 uses the RRC reconfiguration procedure (10, 11) to reconfigure the UE 802 to leave RRC diversity mode and be solely connected to the source cell.

Provided the system is capable of dual connectivity for the UE 802, also potential bearers terminated at the assisting eNB 808 would be reconfigured to terminate at the source eNB 804. For this, the source eNB 804 also sends a path switch command towards the core network so that the packets are routed to the source eNB 804.

Accordingly, FIG. 8 illustrates a Radio link failure (RLF) warning for the assisting eNB 808 out-of-sync.

In the following, a reaction to a source eNB 904 out-of-sync is described. In a step 994, a RLF between the UE 902 and the source eNodeB 904 has occurred. In a step 996, the UE 902 stops transmission to the source eNodeB 904. Thereupon in a step 7, a RLF warning is sent from the UE 902 to the source eNodeB 904 via the assisting eNodeB 908. In a step 8, the source eNodeB 904 sends a handover request to the assisting eNodeB 908. In a step 9, the assisting eNodeB 908 sends a handover acknowledgement to the source eNodeB 904. In a step 11, the source eNodeB 904 sends a RRC reconfiguration request via the assisting eNodeB 908 to the user equipment UE 902. In a step 998, the source eNodeB 904 stops RRC diversity and the assisting eNodeB 908 upgrades to the RRC anchor in a step 999 for the UE 902. In a step 12, the source eNodeB 904 sends a sequence number status transfer to the assisting eNodeB 908, and the UE 902 sends in a step 13 a RRC reconfiguration command to the assisting eNodeB 908. In a step 14, the assisting eNodeB 908 sends a UE context release message to the source eNodeB 904. In a communication up to the receipt of the synchronization and RACH procedure related message received by the UE 902, the UE 902 is connected to the source eNodeB 904. In a time interval between the UE 902 receiving the message in the step 6 and the message transfer in the step 13 taking place, dual connectivity for the UE 902 is performed in which the source eNodeB 904 is the RRC anchor node. From the step 13 onwards, the UE 902 is connected to the assistant eNodeB 908.

Hence, in FIG. 9 RLF on the link to the source eNB 904 occurs and is registered within the UE 902. It will stop its transmission on this link and transmit an RLF warning indication towards the assisting eNB 908 (7) which will (since it is in RRC relaying mode) further forward this indication towards the source eNB 904.

The source eNB 904 will then handover the UE 902 completely to the assisting eNB 908 since it can be sure the connection source 904-UE 902 is lost. Hence, in FIG. 9 RLF on the link to the source eNB 904 occurs and is registered within the UE 902. It will stop its transmission on this link and transmit an RLF warning indication towards the assisting eNB 908 (7) which will (since it is in RRC relaying mode) further forward this indication towards the source eNB 904. The source eNB 904 will then handover the UE 902 completely to the assisting eNB 908 since it can be sure the connection source 904-UE 902 is lost. Therefore, it will send the handover request indication (8) to the assisting eNB 908, which is acknowledged (9) by the assisting eNB 908. The acknowledgment also includes the handover command for the UE 902, which the source eNB 904 is supposed to send to the UE 902. The source eNB 904 will send the handover command (RRC reconfiguration (11)) via the RRC relay, i.e. the assisting eNB 908, to the UE 902. Therefore, it is important that the assisting eNB 908 still remains in RRC relaying mode, even though it received and acknowledges the complete handover of the UE 902 already. After relaying the handover command to the UE 902, the assisting eNB 908 can upgrade itself to be the RRC anchor for the UE 902. The source eNB 904 can stop RRC diversity. Both nodes 904, 908 will now follow the standardized HO procedure, i.e. source eNB 904 will send sequence number status transfer (12) to the assisting eNB 908 and forward buffered packets. The UE 902 will confirm the RRC reconfiguration to be solely connected to the assisting (now anchor) eNB 908 (13), and eventually the assisting eNB 908 will send the UE context release indication to the source eNB 904 (14).

In another embodiment, the assisting eNB 908 being in RRC relaying mode for the UE 902, will transmit the handover command to the UE 902 (11) itself in case the source requests a complete handover. In this variant, the handover request acknowledge message does not need to include the handover command for the UE 902, since the source eNB 904 is not supposed to transmit it anyway. However, the source eNB 904 needs to be informed that the UE 902 is handed over to the assisting eNB 908 and that SN status transfer and buffered data transfer needs to be initiated.

In another embodiment, the assisting eNB 908 could also inspect the RLF warning it forwards and directly send handover acknowledgment to the source eNB 904, as well as handover command to the UE 902 itself.

Accordingly, FIG. 9 illustrates a radio link failure (RLF) warning for the source eNB out-of-sync.

In the following, radio link failure related actions according to embodiments are described.

It is assumed that the current RLF procedure is only triggered if the conditions for RLF on all links are fulfilled simultaneously. Therefore, RRC needs to evaluate physical layer problems of all links separately.

The timers and constants for the UE 802, 902 to evaluate physical layer problems shall be configurable on a per link basis, thus multiple instances of the IE rlf-TimersAndConstants (or at least a subset of the corresponding timers/constants, e.g. T310, N310, N311) shall exist and be configurable in the UE 802, 902. In another embodiment, the same values are applied to the each of the links, but evaluation is still done independently.

In the following a RLF-TimersAndConstants information element per maintained connection is illustrated. In this information element, the above mentioned timers and constants may be included.

```
-- ASN1START
RLF-TimersAndConstants-r9 ::=    CHOICE {
    release                          NULL,
    setup                            SEQUENCE {
        t301-r9                          ENUMERATED {
                                             ms100, ms200, ms300,
```

```
                              ms400,
                              ms600, ms1000, ms1500,
                              ms2000},
         t310-r9              ENUMERATED {
                              ms0, ms50, ms100, ms200,
                              ms500, ms1000, ms2000},
         n310-r9              ENUMERATED {
                              n1, n2, n3, n4, n6, n8, n10,
                              n20},
         t311-r9              ENUMERATED {
                              ms1000, ms3000, ms5000,
                              ms10000, ms15000,
                              ms20000, ms30000},
n311-r9                       ENUMERATED {
                              n1, n2, n3, n4, n5, n6, n8,
                              n10},
         ...
    }
}
--ASN1STOP
```

To detect a physical layer problem in RRC_CONNECTED, the UE 802, 902 evaluates separately per connected cell i if N310i consecutive "out-of-sync" indications are received from lower layers while neither in T300 i, T301 i, T304 i, T311 i and then starts timer T310 i. Upon receiving N311 i consecutive "in-sync" indications from lower layers while T310 i is running, the UE shall stop timer T310 i. The separate evaluation on a per link basis shall also apply if further advanced techniques of "out-of-sync"/"in-sync" evaluations are applied, e.g. additionally evaluating whether a measurement report was sent.

In the following a RLF-warning procedure according to embodiments is described.

Upon T310 expiry of a certain cell, or maximum number of scheduling requests is reached, or RLC maximum number of retransmissions reached indication for this cell, the UE 802, 902 shall trigger the new RLF-warning procedure as defined in the following.

The UE 802, 902 shall trigger the following modified actions and prepare the RLF-warning indication to be sent directly via a second maintained connection. Additionally the legacy RLF-Report is prepared in a modified way.

The following two pseudo code examples may describe the method embodiments of FIGS. 8, 9 with respect to a RLF procedure according to TS 36.331 V11.2.0 (2012-12), section 5.3.11.3 "Detection of RLF". For ease of clarity, not changed pseudo code portions may have been omitted. In particular, deviations from this standard can be deduced by means of comparison with the pseudo code examples and are presented in bold for ease of visibility. The first pseudo code example may relate to a method embodiment in which the terminal 802, 902 may stop transmitting and receiving via the degraded or failed connection, hence may stop communicating both in an uplink direction and a downlink direction. The second pseudo code example may relate to method embodiment in which the terminal may continue transmitting in an uplink direction via the degraded or failed connection to the respective access node 804, 808, 904, 908 but may not receive any information via the degraded or failed connection towards the respective access node 804, 808, 904, 908.

Alternative 1:
2> don't consider radio link failure to be detected;
2> store the following radio link failure information in the modified VarRLF-Report according to the selection of links to transmit the RLF warning described below or according to the RLF warning contents described below 2> if AS security has not been activated:
3> don't perform the actions upon leaving RRC_CONNECTED as specified in 36.331/5.3.12, with release cause 'other';
2> else:
3> don't initiate the connection re-establishment procedure as specified in 36.331/5.3.7;
2> stop transmission and reception on the link for which RLF is detected
2> trigger transmission of the new RLF-warning indication from the UE to E-UTRA via one or multiple of the other maintained connections Alternative 2:
2> don't consider radio link failure to be detected;
2> store the following radio link failure information in the modified VarRLF-Report according to the RLF warning contents described below
2> if AS security has not been activated:
3> don't perform the actions upon leaving RRC_CONNECTED as specified in 36.331/5.3.12, with release cause 'other';
2> else:
3> don't initiate the connection re-establishment procedure as specified in 36.331/5.3.7;
2> trigger transmission of the new RLF-warning indication from the UE to E-UTRA via one or multiple of the other maintained connections With alternative 2 the terminal 802, 902 does not stop transmission/reception on the link for which T310 has expired. Expiry of T310 only means that the downlink channel has problem due to poor channel quality but this does not mean that there are any problems in uplink. The uplink transmissions may therefore successfully reach the base station 804, 808, 904, 908. This is expected to be beneficial especially in case the acknowledgements for the terminals uplink transmissions can be transmitted from the network to the terminal 802, 902 on an alternative link, for example a link for which RLF has not been detected.

If the terminal 802, 902 continues to transmit and receive (attempt to receive) on the link for which T310 has expired then it is possible that if the link later becomes better after RLF has been detected the terminal 802, 902 can resume use of that link.

For example, the terminal 802, 902 may detect a RLF on a connection to one access node 804, 808, 904, 908 of the source access node 804, 904 and the assisting access node 808, 908, the terminal 802, 902 may send, in a first option, the RLF indication to the respective other access node 804, 808, 904, 908 which may forward the RLF indication to the access node 804, 808, 904, 908 associated with the detected RLF. The terminal 802, 902 may stop transmission and/or reception to the access node 804, 808, 904, 908 associated with the detected RLF or may continue transmission and/or reception to the access node 804, 808, 904, 908 associated with the detected RLF. In a second option, the terminal 802, 902 may send the RLF indication to the access node 804, 808, 904, 908 associated with the detected RLF. The terminal 802, 902 might not stop transmission and/or reception to this access node 804, 808, 904, 908 in this case. The access node 804, 808, 904, 908 may in turn forward the RLF warning to the other access node 804, 808, 904, 908 not being associated with the detected RLF.

In the following a selection of links to transmit the RLF-warning according to embodiments is described.

The terminal 802, 902 may select a set of configured links on which it sends the RLF-warning on. For example, it may send the RLF-warning to all cells or a subset of all configured links such as only on the source link.

If the terminal 802, 902 knows that it has one or more alternative links to the node 804, 808, 904, 908 offering the link for which T310 has expired, for example if there are two links from a node to a terminal 802, 902 and T310 expires only for one of these links then it would be beneficial to transmit the RLF-warning on one or more alternative links.

The terminal 802, 902 may even send the RLF-warning on the link for which the T310 has expired. The benefit of sending the RLF-warning on the link for which T310 has expired is that the concerned node 804, 808, 904, 908 may need to be informed about the expiration of T310. The expiration of T310 indicates that the downlink quality is poor however the uplink may still have sufficiently good quality allowing the RLF-warning to reach the concerned node 804, 808, 904, 908.

In the following, RLF-warning contents according to embodiments are described.

(1) This RLF-warning message indicates to E-UTRA that one of the maintained connections is lost. It can optionally include a subset of the information from the legacy RLF-Report, as well as details of the failure reason. It may further include an indicator to which connection the RFL-warning belongs. A non-exhaustive list of potential fields for the RLF-warning is given in the following. Information of the cell the RLF-warning belongs to Primary Cell (PCell) Identification (ID), cell global ID, physical cell ID, carrier frequency of this cell (2) Latest or historic measurement results for the cell the RLF-warning belongs to Reference Signal Received Power (RSRP), Reference Signal Received Quality (RSRQ), or other (3) Latest or historic measurement results for other serving cells RSRP, RSRQ, etc., cell identifiers for the respective measurements (4) Latest or historic measurement results for non-serving neighbor cells E-UTRA, UMTS Terrestrial Radio Access (UTRA), Global System for Mobile Communications (GSM) Enhanced data rates for GSM evolution (EDGE) Radio Access Network (GERAN), CDMA2000, or other systems measurements (5) Time of failure (6) Detailed failure type and reason Out-of-sync, maximum number of scheduling requests, RLF retransmissions reached, etc.

(7) UE state information, list of current events, e.g. measurement events.

(8) Buffer status

In the following, modified RLF-reporting according to embodiments is described. This kind of RLF reporting may be regarded to be modified with respect to legacy RLF reporting according to TS 36.331 V11.2.0 (2012-12) which may be directed to RFL reporting for a single connection between a terminal 802, 902 and an access node 804, 808, 904, 908.

In the original RLF reporting, the UE 802, 902 stores RLF related information for the (single) link where the failure occurred and sends the report to E-UTRAN upon request. The report is overridden when another RLF occurs. In RRC diversity, the UE 802, 902 shall trigger the original RLF procedure as well as the original RLF report only if all links fail. So, this reporting can be modified to convey information about multiple links.

In one embodiment, the single modified RLF report can include information about multiple or all links.

In another embodiment, multiple RLF reports, so one per link can be created and requested independently or collectively by E-UTRA.

In the following, Channel Quality Indicator (CQI) monitoring in network is described. A CQI information or report may represent an alternative embodiment for the quality degradation information with respect to RFL warning indications described above.

As an alternative to using RLF-warnings in the network to trigger RRC-reconfigurations for the UE 802, 902 as explained above, CQI reports received for each link in the respective network node 804, 808, 904, 908 can be forwarded to another node 804, 808, 904, 908, which is also currently connected to the UE 802, 902. For example, in the case in which the source eNodeB 804, 904 may be associated with a connection quality degradation, the CQI received by the source eNodeB 804, 904 may be transmitted to the assisting eNodeB 808, 908. In the case in which the assisting eNodeB 808, 908 may be associated with a connection quality degradation, the CQI report received by the assisting eNodeB 804, 904 may be sent to the source eNodeB 804, 904. In one embodiment the network will monitor the received CQI reports received from the terminal 802, 902 regarding the terminal's different connections. If the reported CQI indicates a channel quality for one connection below a certain threshold the network will consider that connection unfit for use by the terminal 802, 902.

In case the network considers the quality of a connection is not good enough and unfit for use by the terminal 802, 902 it may take actions such as the following. Note that different behavior may be applied depending on which type of connection is concerned:

(1) Trigger a handover—The network can order the terminal 802, 902 to perform a handover to another, probably better quality, cell. If the connection with bad quality is the source cell this is one alternative to ensuring that another cell becomes the source connection. In case the assisting cell has been identified to be of better quality than the source cell, a similar procedure such as described above for the reaction to a source eNB out-of-syn can be envisaged.

(2) Source and assisting cell switch—If the network detects that the source cell's quality is below a certain threshold while the quality of an assisting cell is acceptable the network could trigger a switch so that an assisting cell instead becomes the source cell and the source cell instead becomes an assisting cell. This is similar to a handover however it may not include the RRC-reconfiguration in the UE 802, 902, since the UE 802, 902 can be oblivious of the network element 804, 808, 904, 908 acting as the RRC anchor.

(3) Deconfigure the assisting cell—If the quality of a cell which is serving as an assisting cell is bad the motivation to keep the assisting cell. The network may therefore deconfigure the assisting cell. In case after the deconfiguration of the assisting cell the terminal 802, 902 is only configured with the source cell RRC diversity may be de-configured. This behavior is similar to the procedure described above for a reaction to an assisting eNB out-of-sync.

In the following, RLF-warnings for UL/DL trouble shooting in E-UTRAN according to embodiments are described.

Whenever an RLF warning occurs for one link of the connection (triggered e.g. by out-of-sync, maximum number of scheduling requests reached or maximum number of RLC retransmissions reached) the receiving eNB 804, 808, 904, 908 can utilize the information about failure reason and UE measurements etc. as given in the warning message by combining it with its own information about the working link, e.g. about current events and transmissions done to UE. So, with the RLF warning procedure, E-UTRAN is able to combine UE and eNB information to determine if the problem was related to that eNB 804, 808, 904, 908 did not receive the UE 802, 902 on the link where problems was indicated or vice versa or both.

Also the eNB 804, 808, 904, 908 may experience similar faults as the UE 802, 902 e.g. maximum number of resynch attempts reached, maximum number of scheduling requests reached or maximum number of RLC retransmission reached and then eNB 804, 808, 904, 908 could ask the UE 802, 902 to provide historic data about UE events and transmissions done. This functionality can be established with another request/response message exchange triggered by the eNB 804, 808, 904, 908 and transmitted via one of the maintained connections.

With the combined information E-UTRAN is able to quickly react upon these connectivity problems and adapt its system settings to improve the performance for the UE 802, 902 and the overall system, e.g. certain key performance indicators.

Further embodiments are as follows:

In an embodiment, instead of triggering the RLF warning transmission depending on the existing T310 timer for this respective link, a new timer per link is used, which is started simultaneously with the T310 timer, but has a different expiry time. This way, RLF warning indication transmission can be triggered independently of the existing RLF evaluation per link, thus the RLF warning can be transmitted e.g. earlier than RLF on that link is triggered. Also, second N310 and N311 constants per link can be used for this evaluation.

In the following advantages of one or more embodiments are described.

With the provided solution unnecessary transmissions between a UE 802, 902 and an eNB 804, 808, 904, 908 are avoided in RRC diversity mode. In this way interference and battery consumption are decreased. With the discussed procedures the UE 802, 902 is able to maintain an RRC connection when experiencing RLF on one link in a diversity transmission mode. A fast fallback (or fast fall-forward) to one of the maintained connections if one of the connections fails is ensured.

Moreover, this solution will allow an operator to understand the root cause for intermittent performance degradations in a radio network and especially understand if it is a network problem or a UE problem or both. The method will also work in rather poor conditions since only one out of several connections to the network need to work.

With this solution the system is able to very quickly adapt to UE connectivity problems and adapt the system to improve the system's performance.

Figure 10:
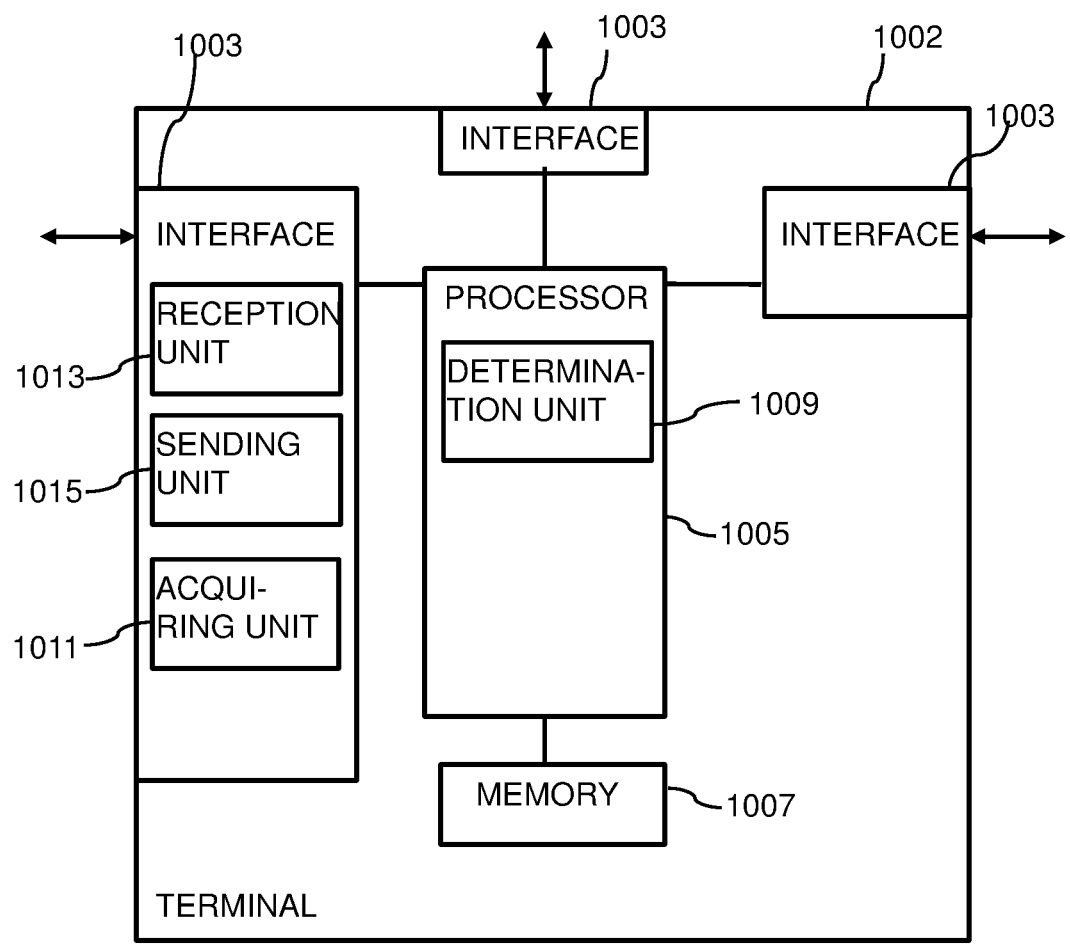
FIG. 10 is a block diagram illustrating a terminal for adapting a mobile network according to an embodiment.

Referring to FIG. 10, a terminal 1002 for adapting a mobile network is described. For example, the terminal 1002 may correspond to the terminal 802 or 902. The terminal 1002 is connected to a first access node of the mobile network via a first connection and to a second access node via a second connection. The first access node controls a data transmission for the terminal 1002 and wherein the second access node assists in the data transmission for the terminal 1002. The terminal 1002 may comprise one or more interfaces 1003 to the first and second access nodes. The one or more interfaces 1003 may be coupled each to a processor 1005 of the terminal 1002, which processor 1005 has access to a memory 1007 of the terminal 1002.

The terminal 1002 comprises a determination unit 1009 adapted to determining whether a quality of at least one of the first connection and the second connection is degraded, and an acquiring unit 1011 adapted to acquire quality degradation information about the degradation of the quality of at least one of the first connection and the second connection based on the determination for adapting the mobile network based on the acquired quality degradation information. In a further implementation, the terminal 1002 may comprise a determination unit 1009 adapted to determining whether a quality of at least one of the first connection and the second connection may be degraded, and an acquiring unit 1011 adapted to acquire quality degradation information about the degradation of the quality of at least one of the first connection and the second connection based on the determination particularly for adapting the mobile network.

In the above two described implementations, the determination unit 1009 may be part of the processor 1005. Further, the acquiring unit 1011 may be part of the one or more interfaces 1003. The one or more interfaces 1003 may further comprise a reception unit 1013 and a sending unit 1015 for implementing receiving and sending capabilities of the one or more interfaces 1003, respectively. The sending unit 1015 may implement above described functionalities related to sending the quality degradation information.

The terminal 1002 is adapted to perform a method according to embodiments described above and comprises respective functionality based units imbedded in respective physical units 1003, 1005, 1007 illustrated in FIG. 10.

Figure 11:
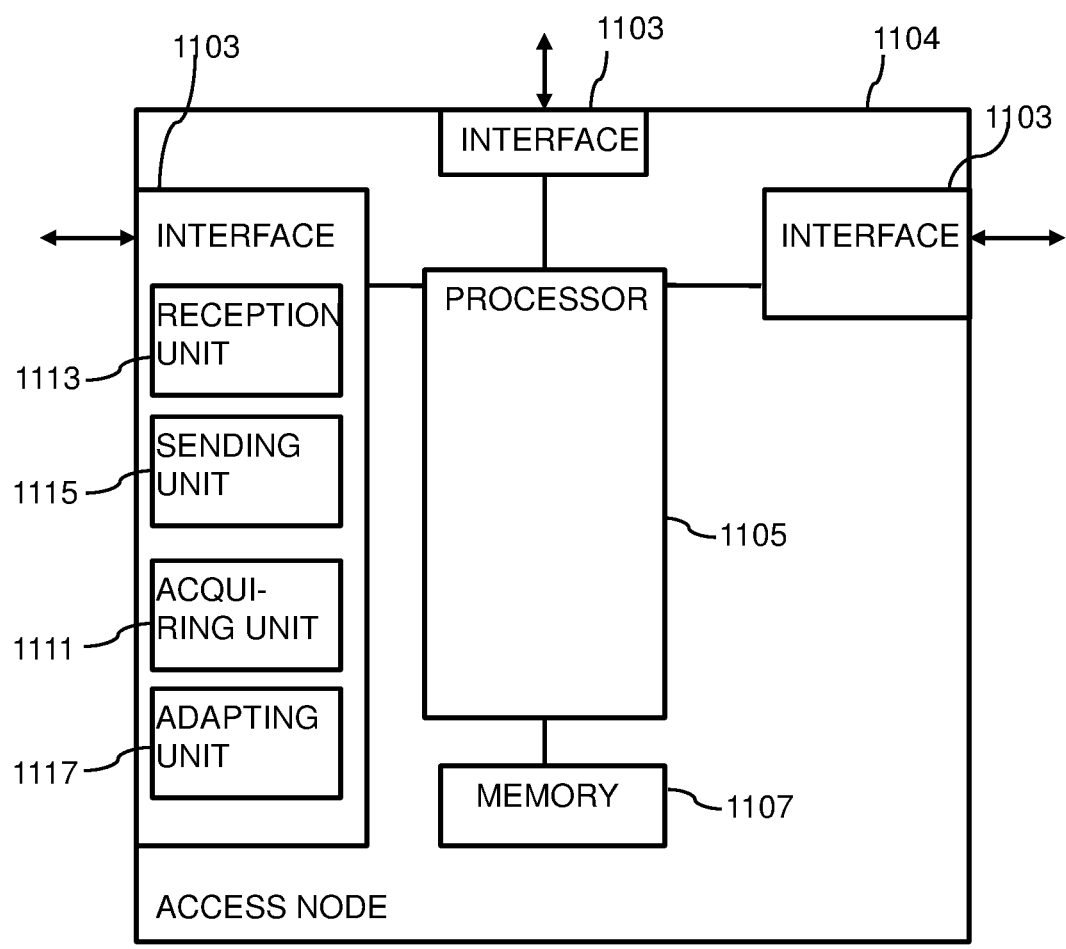
FIG. 11 is a block diagram illustrating an access node for adapting a mobile network according to an embodiment.

Referring to FIG. 11, an access node 1104 for adapting a mobile network is illustrated. For example, the access node 1104 may correspond to the first access node 804, 904. A terminal is connected to the access node 1104 of the mobile network via a connection and to another access node via another second connection. The access node 1104 controls a data transmission for the terminal and the another access node assists in the data transmission for the terminal. The access node 1004 may comprise one or more interfaces 1103 to the terminal and the another access node. The one or more interfaces 1103 may be coupled each to a processor 1105 of the access node 1104, which processor 1005 has access to a memory 1107 of the access node 1104.

The access node 1104 comprises an acquiring unit 1111 adapted to acquire quality degradation information about a degradation of a quality of at least one of the first connection and the second connection based on a determination whether the quality of at least one of the first connection and the second connection is degraded, and an adapting unit 1117 adapted to adapt the mobile network based on the acquired quality degradation information. In a further implementation, the access node 1104 may comprise an acquiring unit 1111 adapted to acquire quality degradation information about a degradation of a quality of at least one of the first connection and the second connection. For example, the quality degradation information may be based on a determination whether the quality of at least one of the first connection and the second connection may be degraded. In this further implementation, the access node 1104 may comprise an adapting unit 1117 adapted to adapt the mobile network based on the acquired quality degradation information. In both implementations, the access node 1104 may further comprise a determination unit adapted to determine whether the quality of at least one of the connection and the another connection may be degraded.

In the above two implementations, the acquiring unit 1111 and the adapting unit 1117 may be part of the one or more interfaces 1103. The one or more interfaces 1103 may further comprise a reception unit 1113 and a sending unit 1115 for implementing receiving and sending capabilities of the one or more interfaces 1103, respectively. The determination unit may be part of the processor 1105.

The access node 1104 is adapted to perform a method according to embodiments described above and comprises respective functionality based units imbedded in respective physical units 1103, 1105, 1107 illustrated in FIG. 11.

Figure 12:
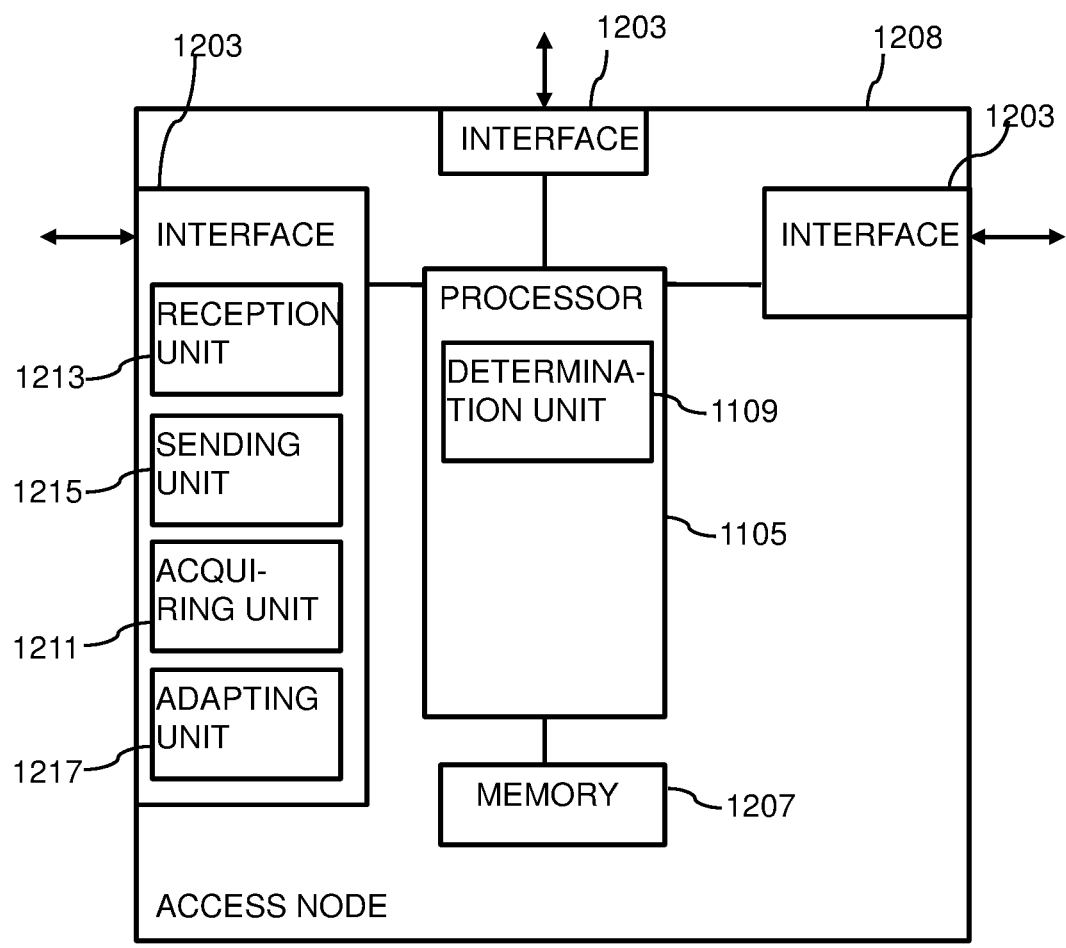
FIG. 12 is a block diagram illustrating an access node for adapting a mobile network according to another embodiment.

Referring to FIG. 12, an access node 1208 for adapting a mobile network is illustrated. For example, the access node 1208 may correspond to the access node 808, 908. A terminal is connected to the access node 1208 of the mobile network via a connection and to another access node via another connection. The another access node controls a data transmission for the terminal and the access node 1208 assists in the data transmission for the terminal. The access node 1208 may comprise one or more interfaces 1103 to the terminal and the another access node. The one or more interfaces 1203 may be coupled each to a processor 1205 of the access node 1208, which processor 1205 has access to a memory 1107 of the access node 1208.

The access node 1208 comprises an adapting unit 1217 adapted to adapt the mobile network based on acquired quality degradation information about a degradation of a quality of at least one of the connection and the another connection, the acquiring of the quality degradation information being based on a determination whether a quality of at least one of the connection and the another connection is degraded. In a further implementation, the access node 1208 may comprise an adapting unit 1217 adapted to adapt the mobile network based on a quality of at least one of the connection and the another connection being degraded. In this implementation, the adapting unit 1217 unit may be adapted to perform the adaption based on acquired quality degradation information about a degradation of a quality of at least one of the connection and the another connection. The acquiring of the quality degradation information may be based on a determination whether a quality of at least one of the connection and the another connection is degraded.

In both latter implementations, the access node 1208 may comprise an acquiring unit 1211 adapted to acquire the quality degradation information. In both latter described implementations, the access node 1208 may also comprise a determination unit 1209 adapted to determine whether the quality of at least one of the connection and the another connection may be degraded.

The adapting unit 1217 may be part of the one or more interfaces 1203, and the acquiring unit 1011 may be also part of the one or more interfaces 1203. The one or more interfaces 1203 may further comprise a reception unit 1213 and a sending unit 1215 for implementing receiving and sending capabilities of the one or more interfaces 1203, respectively. The determination unit 1209 may be part of the processor 1205.

The access node 1208 is adapted to perform a method according to embodiments described above and comprises respective functionality based units imbedded in respective physical units 1203, 1205, 1207 illustrated in FIG. 12.

It is noted that the described functionality based units 1009 to 1015, 1109 to 1117, 1209 to 1217 for implementing the above described functionalities of the respective entity 1002, 1104, 1208 may be also realized in software and/or in hardware and software. To this end, suitable configured computer program code may be stored for implementing the above-described functionalities of the respective entity 1002, 1104, 1208 in the memory 1007, 1107, 1207 of the respective above described entity 1002, 1104, 1208. The memory 1007, 1107, 1207 and the computer program code may form a computer program product. The computer program code may be also stored on a different memory loadable into the memory 1007, 1107, 1207 of the respective entity 1002, 1104, 1208. The computer program code may be also provided in a downloadable form, forming a further computer program product.

It is noted that an association between the physical units 1003 to 1007, 1103 to 1107, 1203 to 1207 of the terminal 1002 and access nodes 1104, 1208 illustrated in FIGS. 10 to 12, respectively, and the functionality based units 1009 to 1015, 1109 to 1117, 1209 to 1217 of the terminal 1002 and access nodes 1104, 1204 illustrated these Figures, respectively, may differ from the described embodiments. For example, the acquiring unit 1011 of the terminal 1002 illustrated in FIG. 10 may be part of the interface 1003, the processor 1005, and the memory 1007 of the terminal 1002.

It is noted that the embodiments are applicable to LTE and radio access networks of GSM and UMTS.

In the following, various further embodiments of the present disclosure will be described.

1. A method embodiment for adapting a mobile network, wherein a terminal is connected to a first access node of the mobile network via a first connection and to a second access node via a second connection, wherein the first access node controls a data transmission for the terminal and wherein the second access node assists in the data transmission for the terminal, the method comprising:

determining whether a quality of at least one of the first connection and the second connection is degraded, acquiring quality degradation information about the degradation of the quality of at least one of the first connection and the second connection based on the step of determining, and adapting the mobile network based on the step of acquiring.

In particular, the terminal is part of the mobile network.

In particular, the term "the first access node controlling a data transmission of the terminal" may particularly denote to control, by the first access node, of resource allocation for uplink and/or downlink data transmission for the terminal and/or a connectivity state of the terminal. In particular, the first access node can be referred to as an anchor node for the data transmission of the terminal, for example, always being employed for the data transmission for the terminal. For example, in LTE the controlling of the data transmission may comprise terminating a protocol related to the allocation of resources via the air interface between the terminal and the first access node, particularly a RRC protocol, in the first access node.

In particular, the term "the second access node assisting in the data transmission for the terminal" may particularly denote that the second access node may be free of a capability of controlling the data transmission to the terminal by may relay the uplink and/or downlink data transmission between the access node and the terminal. In particular, the second access node can be referred to as a booster node for the data transmission of the terminal, for example, being employed for the data transmission for the terminal as relay node. Hence, information sent between the first access node and the terminal may be duplicatedly sent between the first access node and the terminal via the second access node.

In particular, the term "data transmission" may comprise transmission of signaling data and/or payload data in the uplink direction from the terminal to the mobile network and/or downlink direction from the mobile network to the terminal.

In particular, the first connection and the second connection may be independent from one another and may comprise respective radio bearers to be established related to the data transmission.

Figure 4:
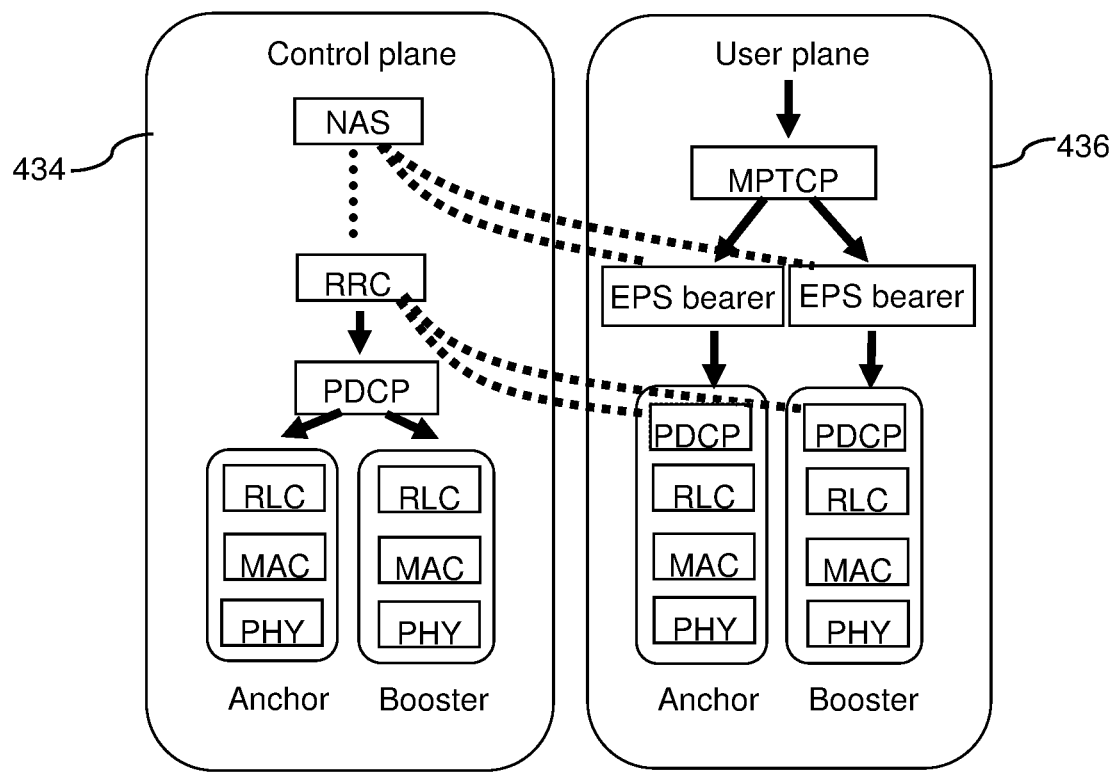
FIG. 4 is a diagram illustrating a control plane and user plane terminating in access nodes.
Figure 5:
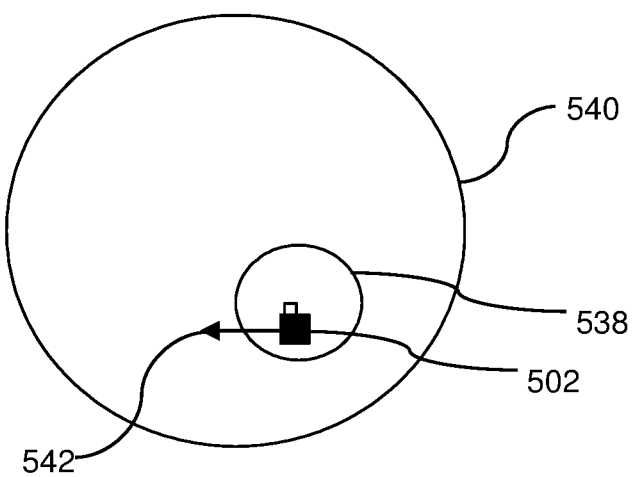
FIG. 5 is a block diagram illustrating a LTE mobile network.
Figure 6:
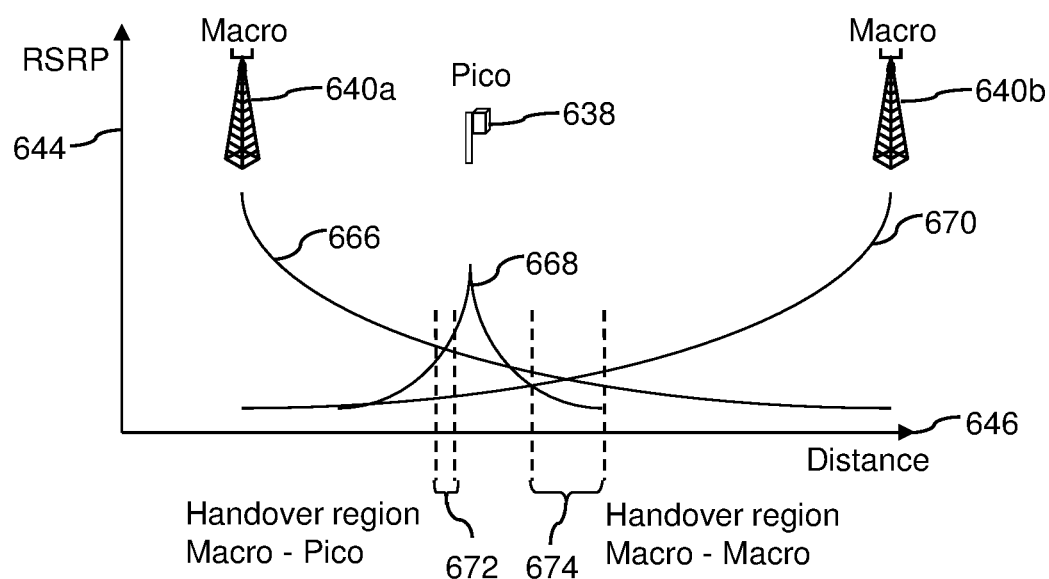
FIG. 6 is a diagram illustrating a signal strength of a LTE mobile network depending on a distance.

In particular, the first access node is referred in described embodiments as "Source eNB" and the first connection is labeled in FIG. 4 by "anchor". In particular, the second access node is referenced in described embodiments as "Assisting eNB". The second connection is labeled in FIG. 4 by "booster" It is noted that the target eNB described in connection with FIGS. 1A, 1B and 2 also represents an access node adapted to control the data transmission for the terminal.

In particular, in the data transmission for the terminal, data are sent from the first access node to the terminal and data duplicates are sent from the second access node to the terminal. The first access node may have duplicated the respective data and hay have sent the data duplicates to the second access node.

2. The method according to embodiment 1, wherein the step of determining results in the first connection having failed, wherein the step of adapting comprises:

maintaining the connection which is not failed.

3. The method according to any preceding embodiment, wherein the step of determining results in the first connection having failed, wherein the step of adapting comprises:

handing, by the first access node, the terminal over from the first access node to the second access node and disconnecting the first connection.

For example, the first access node may initiate the handover of the terminal by sending a handover request to the second access node. The second access node may forward or relay the handover request to the terminal. The first access node may stop controlling the data transmission of the terminal. In LTE the latter may relate to stop RRC diversity. In RRC diversity employed in the first access node may relate to a sending of data directly to the terminal and to a sending of duplicates of the data, which are sent by the first access node to the terminal, to the second access node for relaying them by the second access node to the terminal. Accordingly, stopping RRC diversity may refer to not duplicating the sent data anymore, thus maintaining only the direct connection to the terminal to keep a legacy functionality. Or in other words, particularly with respect to LTE, the latter may relate to stopping RRC signal duplication and forwarding to the second access node.

4. The method according to embodiment 3, wherein the step of adapting further comprises:

transferring, by the first access node, control capabilities for controlling the data transmission of the terminal from the first access node to the second access node.

In particular, embodiments 3 and 4 are described with reference to FIG. 9.

5. The method according to any preceding embodiment, wherein the step of determining results in the second connection having failed, wherein the step of adapting comprises:

requesting, by the first access node, to disconnect the second connection, and stopping to employ the second access node for the data transmission for the terminal.

In particular, the step of stopping to employ the second access node for the data transmission may comprise stopping to duplicate the data sent from the first access node to the terminal and stopping to send the duplicated data to the second access node. In particular, this step may be embodied as stopping RRC diversity, relating to not duplicating the data or messages anymore which may be to be sent to the second access node. Thus only a direct connection from the first access node to the UE may be maintained, the latter referring to as legacy functionality of the first access node of the mobile network.

In particular, embodiment 5 is described with reference to FIG. 8.

6. The method according to any preceding embodiment, wherein the step of determining results in one connection of the first connection and the second connection having failed, wherein the step of acquiring comprises:

sending, by the terminal, the quality degradation information to the access node of the first access node and the second access node whose connection to the terminal has not failed.

In particular, the quality degradation information may be sent to the first access node, if the second connection may have failed, as explained with reference to FIG. 8. The quality degradation information may be sent to the second access node, if the first connection may have failed, and may be relayed or forwarded by the second access node to the first access node.

7. The method according the embodiment 6, wherein the quality degradation information comprises a failure notification indication, particularly a RLF warning indication as explained above.

In particular, the failure notification indication may represent an individual indication, particularly included in a conventional message or a new type message, or may be a specific type of message.

In particular, in accordance with any preceding embodiment, the quality degradation information may comprise at least one information selected from the group of:

a cell identification indication indicative of an identification of an area, particularly a cell, being served by the access node associated with the failed connection, particularly an PCell Identification (ID), a cell global ID, a physical cell ID, a carrier frequency of the cell, information about measurement results obtained for the area served by the access node associated with the failed connection and obtained for a previous time period, information about measurement result obtained for an area, particularly a cell, served by the access node associated with the not failed connection and obtained for a previous time period, information about a measurement result obtained for at least one further area, particularly a further cell, served by a further access node distinct from the first access node and second access node and obtained for a previous time period, particularly an identifier for the measurement a connection indication indicative of the failed connection, a timer of the failure of the failed connection, and a failure reason.

In particular, the failure reason may comprise at least one of the following:

an expiration of a timer, the timer being started after a predetermined number of a counter fulfillments of a condition and the timer being stopped after a predetermined number of counter fulfillments of another condition; for example in LTE the latter may correspond to "Out of sync" referring to a RLF timer expiry, a maximum of scheduling requests having been sent over the respective connection; for example in LTE the latter may correspond to a maximum number of RLC retransmissions having been reached, a maximum of retransmission of data having been sent by the terminal over the respective connection; for example in LTE the latter may correspond a maximum number of scheduling requests having been reached; and a maximum of unsuccessful random access attempts having been sent by the terminal over the respective connection without receiving a data transmission over the respective connection; for example in LTE the latter may correspond to a Random Access Channel (RACH) failure.

In particular, the at least one information mentioned above may be sent together with the failure notification indication in one message or may be sent subsequent to the sent failure notification indication for the step of acquiring.

8. The method according to any preceding embodiment, wherein the step of determining results in the first connection and the second connection having failed, wherein the step of adapting comprises establishing a further connection between the terminal and a further access node of the mobile network.

In particular, in accordance with the preceding embodiment, the step of acquiring may be performed by the terminal. The step of establishing may be initiated by the terminal. The further access node may be distinct from the first access node and the second access node or may be one of the first and second access nodes.

9. The method according to any preceding embodiment, the method further comprising:

determining at least one key performance indication for the mobile network, wherein the step of adapting comprises adapting at least one system setting of the mobile network based on the at least one key performance indication.

In particular, the step of adapting of the system settings may be alternatively or additionally based on quality degradation information obtained, particularly sent in RLF reports. An objective of this adaption may be the improvement of one of the key performance indicators in the network.

In particular, the system setting may relate to a characteristic of the first and/or second access node or may relate to a characteristic of a further access node of the mobile network.

In particular, embodiments 2 to 8 may describe an immediate or ad hoc adapted of the mobile network. Embodiments 9 may describe an overall adaption of the mobile network on an intermediate or long term time scale.

10. The method according to any preceding embodiment, wherein the step of determining is performed by the terminal and comprises evaluating the quality of the first connection and evaluating the quality of the second connection.

In particular, the step of evaluating of the quality of the first connection and the step of evaluating the quality of the second connection is performed independently of one another.

11. The method according to the preceding embodiment, wherein the respective step of evaluating comprises evaluating a synchronization of the terminal with the respective access node with respect to the data transmission over the respective connection.

In particular, a degradation of the quality of the respective connection may be determined, if the terminal may be not suitably synchronized for the data transmission over the respective connection. In particular, the determined degradation of the quality of the connection may correspond to a connection failure.

12. The method according to the preceding embodiment, wherein the step of determining comprises, particularly for each of the first and second connections, using a timer in the terminal and a counter in the terminal, the counter being associated with fulfillment of a condition, wherein a degradation of the quality of the respective connection is determined, if the timer expires, the timer being started after a predetermined number of the counter fulfillments of the condition, and the timer being stopped after a predetermined number of counter fulfillments of another condition.

In particular, the timer may correspond to the T310 timer and the counter may correspond to the constant N310 both described above. In particular, the same or different type of timers and/or counters can be employed for the first and second connections.

In particular, in accordance with any preceding embodiment, the step of determining comprises, particularly for each of the first and second connections, using a timer in the terminal and counters in the terminal, one counter being associated with fulfillment of a condition, wherein a degradation of the quality of the respective connection is determined, if the timer expires, the timer being started after a predetermined number of the counter fulfillments of the condition, and the timer being stopped after a predetermined number of another counter fulfillments of another condition.

In particular, the timer may correspond to the T310 timer and the counters may correspond to the constants N310, N311 as described above. In particular, the same or different type of timers and/or counters can be employed for the first and second connections.

13. The method according to the embodiments 10 to 12, wherein the respective step of evaluating comprises evaluating whether a maximum of scheduling requests has been sent over the respective connection.

14. The method according to the embodiments 10 to 13, wherein the respective step of evaluating comprises evaluating whether a maximum of retransmission of data has been sent by the terminal over the respective connection.

15. The method according to the embodiments 10 to 14, wherein the respective step of evaluating comprises evaluating whether a maximum of unsuccessful random access attempts has been sent by the terminal over the respective connection without receiving a data transmission over the respective connection.

16. The method according to any preceding embodiment, wherein the step of acquiring comprises sending by the second access node to the first access the quality degradation information.

In particular, the latter embodiment may apply in a case in which at least one of the first and second connections may comprise a degraded or low quality but might not have failed. For example, the quality degradation information may comprise a channel quality indication. The step of determining may be performed by the second access node which may monitor a parameter associated with the channel quality information and/or may determine a value of the parameter.

In particular, the latter embodiment may apply to the embodiment related to handing over the terminal and to the embodiment related to the handover combined with the transfer of the control capabilities.

17. A method embodiment for adapting a mobile network, wherein a terminal is connected to a first access node of the mobile network via a first connection and to a second access node via a second connection, wherein the first access node controls a data transmission for the terminal and wherein the second access node assists in the data transmission for the terminal, the method being performed by the terminal and comprising:

determining whether a quality of at least one of the first connection and the second connection is degraded, acquiring quality degradation information about the degradation of the quality of at least one of the first connection and the second connection based on the step of determining for adapting the mobile network based on the step of acquiring.

18. A method embodiment for adapting a mobile network, wherein a terminal is connected to a first access node of the mobile network via a first connection and to a second access node via a second connection, wherein the first access node controls a data transmission for the terminal and wherein the second access node assists in the data transmission for the terminal, the method being performed by the first access node and comprising:

acquiring quality degradation information about a degradation of a quality of at least one of the first connection and the second connection based on a determination whether the quality of at least one of the first connection and the second connection is degraded, and adapting the mobile network based on the step of acquiring.

19. A method embodiment for adapting a mobile network, wherein a terminal is connected to a first access node of the mobile network via a first connection and to a second access node via a second connection, wherein the first access node controls a data transmission for the terminal and wherein the second access node assists in the data transmission for the terminal, the method being performed by the second access node and comprising:

adapting the mobile network based on acquired quality degradation information about a degradation of a quality of at least one of the first connection and the second connection, the acquiring being based on a determination whether a quality of at least one of the first connection and the second connection is degraded.

20. A terminal embodiment for adapting a mobile network, wherein the terminal is connected to a first access node of the mobile network via a first connection and to a second access node via a second connection, wherein the first access node controls a data transmission for the terminal and wherein the second access node assists in the data transmission for the terminal, the terminal comprising:

a determination unit adapted to determining whether a quality of at least one of the first connection and the second connection is degraded, an acquiring unit adapted to acquire quality degradation information about the degradation of the quality of at least one of the first connection and the second connection based on the determination for adapting the mobile network based on the acquired quality degradation information.

In particular, the terminal may be adapted to perform a method according to any one of embodiments 1 to 18.

21. An access node embodiment for adapting a mobile network, wherein a terminal is connected to the access node of the mobile network via a connection and to another access node via another second connection, wherein the access node controls a data transmission for the terminal and wherein the another access node assists in the data transmission for the terminal, the access node comprising:

an acquiring unit adapted to acquire quality degradation information about a degradation of a quality of at least one of the first connection and the second connection based on a determination whether the quality of at least one of the first connection and the second connection is degraded, and an adapting unit adapted to adapt the mobile network based on the acquired quality degradation information.

In particular, the access node may be adapted to perform a method according to any one of embodiments 1 to 17 and 19.

22. An access node embodiment for adapting a mobile network, wherein a terminal is connected to the access node of the mobile network via a connection and to another access node via another connection, wherein the another access node controls a data transmission for the terminal and wherein the access node assists in the data transmission for the terminal, the access node comprising:

an adapting unit adapted to adapt the mobile network based on acquired quality degradation information about a degradation of a quality of at least one of the connection and the another connection, the acquiring of the quality degradation unit being based on a determination whether a quality of at least one of the connection and the another connection is degraded.

In particular, the access node may be adapted to perform a method according to anyone of embodiments 1 to 17 and 19.

23. A mobile network embodiment, comprising a terminal according to embodiment 20, a first access node according to embodiment 21, and a second access node according to embodiment 22.

24. A computer program, which, when being executed by a processor, is adapted to carry out or control a method for handling a terminating circuit switched signaling service to a terminal in a mobile network according to any one of embodiments 1 to 19.

It is noted that the above described embodiments related to method according to embodiments 1 to 16 apply to the embodiments related to other methods according to embodiments 17 to 19, the terminal, the first access node, the second access node, a mobile network and the computer programs.

What is claimed is:

1. A method in a first access node for communicating in a mobile network, wherein the first access node is connected via a first connection to a user equipment and is configured to control a data transmission for the user equipment, wherein the data transmission is assisted by a second access node which is connected to the user equipment via a second connection, the method comprising:

receiving, from the user equipment, a failure notification indication indicative of a failure of the second connection and a failure reason related to an expiration of a timer, with the timer being started after a predetermined number of counter fulfillments of a condition and the timer being stopped after a predetermined number of counter fulfillments of another condition; and adapting the mobile network based on the received failure notification indication.

2. The method according to claim 1, wherein adapting the mobile network comprises adapting at least one connection between the user equipment and the mobile network based on the failure notification indication.

3. The method according to claim 1, wherein the second connection has failed, and wherein said adapting comprises:

requesting to disconnect the second connection, and stopping to employ the second access node for the data transmission for the user equipment.

4. The method according to claim 1, wherein the user equipment is operating in dual connectivity with simultaneous first and second connections to the first and second access nodes, respectively, wherein the first access node provides a single control plane connection for the user equipment to a core network of the mobile network, wherein the second access node does not provide a control plane connection for the user equipment to the core network.

5. A method in a user equipment for communicating in a mobile network, wherein the user equipment is connected via a first connection to a first access node of the mobile network and via a second connection to a second access node of the mobile network, wherein the first access node controls a data transmission for the user equipment and wherein the second access node assists in the data transmission for the user equipment, the method comprising:
  determining that the second connection has failed, wherein the determining comprises, for the second connection, using a timer in the user equipment and a counter in the user equipment, wherein the failure of the second connection is determined based on expiration of the timer, wherein the user equipment is configured to start the timer after a predetermined number of counter fulfillments of a condition and to stop the timer after a predetermined number of counter fulfillments of another condition; and
  sending, to the first access node, a failure notification indication indicative of failure of the second connection and a failure reason related to the expiration of the timer.

6. The method according to claim 5, wherein failure notification indication is a radio link failure, RLF, warning indication.

7. The method according to claim 5, wherein a cell identification indication is sent to the first access node, the cell identification indication being indicative of an identification of a cell being served by the second access node associated with the failed second connection.

8. The method according to claim 5, wherein information about measurement results obtained for an area served by the second access node associated with the failed second connection is sent to the first access node.

9. The method according to claim 5, wherein information about a measurement result obtained for a cell served by the first access node associated with the first connection that has not failed is sent to the first access node.

10. The method according to claim 5, wherein a connection indication indicative of the failed second connection is sent to the first access node.

11. The method according to claim 5, wherein determining that the second connection has failed comprises evaluating a quality of the second connection.

12. The method according to claim 11, wherein said evaluating comprises evaluating a synchronization of the user equipment with the second access node for the data transmission over the second connection.

13. The method according to claim 11, wherein said evaluating comprises evaluating whether a maximum of retransmission of data has been sent by the user equipment over the second connection.

14. The method according to claim 11, wherein said evaluating comprises evaluating whether a maximum of unsuccessful random access attempts has been sent by the user equipment over the second connection without receiving a data transmission over the second connection.

15. The method according to claim 5, further comprising receiving from the first access node a request to disconnect the second connection.

16. The method according to claim 15, further comprising stopping to employ the second access node for the data transmission for the user equipment.

17. The method according to claim 5, wherein the user equipment is operating in dual connectivity with simultaneous first and second connections to the first and second access nodes, respectively, wherein the first access node provides a single control plane connection for the user equipment to a core network of the mobile network, wherein the second access node does not provide a control plane connection for the user equipment to the core network.

18. A method for communicating in a mobile network, wherein a user equipment is connected to a first access node of the mobile network via a first connection and to a second access node of the mobile network via a second connection, wherein the first access node controls a data transmission for the user equipment and wherein the second access node assists in the data transmission for the user equipment, the method comprising:
  receiving, by the first access node, a failure notification indication indicative of a failure of the second connection and a failure reason related to an expiration of a timer, wherein the timer is to be started after a predetermined number of counter fulfillments of a condition and is to be stopped after a predetermined number of counter fulfillments of another condition;
  sending, by the first access node to the second access node, a request to disconnect the second connection;
  receiving, by the second access node from the first access node, the request to disconnect the second connection; and
  stopping, by the first access node, to employ the second access node for the data transmission for the user equipment.

19. A user equipment for communicating in a mobile network, wherein the user equipment is configured to be connected via a first connection to a first access node of the mobile network and via a second connection to a second access node of the mobile network, wherein the first access node is configured to control a data transmission for the user equipment, and wherein the second access node is configured to assist in the data transmission for the user equipment, the user equipment comprising a processing circuit configured to:
  determine that the second connection has failed, wherein the determination comprises, for the second connection, usage of a timer in the user equipment and a counter in the user equipment, the counter being associated with fulfillment of a condition, wherein the failure of the second connection is determined by expiration of the timer, the timer being started after a predetermined number of counter fulfillments of the condition, and the timer being stopped after a predetermined number of counter fulfillments of another condition, and
  send to the first access node a failure notification indication indicative of the failure of the second connection and a failure reason related to the expiration of the timer.

20. The user equipment according to claim 19, wherein failure notification indication is a radio link failure, RLF, warning indication.

21. The user equipment according to claim 19, wherein the processing circuit is configured to send a cell identification indication from the user equipment to the first access node, the cell identification indication being indicative of an identification of a cell being served by the second access node associated with the failed connection.

22. The user equipment according to claim 21, wherein the cell identification indication is a cell global ID, a physical cell ID, or a carrier frequency of the cell.

23. The user equipment according to claim 19, wherein the processing circuit is configured to send to the first access node information about measurement results obtained by the user equipment for the area served by the second access node associated with the failed connection.

24. The user equipment according to claim 19, wherein the processing circuit is configured to send information to the first access node about a measurement result obtained for a cell served by the access node associated with a not failed connection.

25. The user equipment according to claim 19, wherein the processing circuit is configured to send a connection indication indicative of the failed connection to the first access node.

26. The user equipment according to claim 19, wherein the determination that the second connection has failed comprises evaluation the quality of the second connection.

27. The user equipment according to claim 26, wherein the evaluation comprises evaluation of a synchronization of the user equipment with the second access node for the data transmission over the second connection.

28. The user equipment according to claim 26, wherein the evaluation comprises evaluation whether a maximum of retransmission of data has been sent by the user equipment over the second connection.

29. The user equipment according to claim 26, wherein the evaluation comprises evaluation whether a maximum of unsuccessful random access attempts has been sent by the user equipment over the second connection without receiving a data transmission over the second connection.

30. The user equipment according to claim 19, wherein the processing circuit is further configured to receive from the first access node a request to disconnect the second connection.

31. The user equipment according to claim 30, wherein the processing circuit is further configured to stop to employ the second access node for the data transmission for the user equipment.

32. The user equipment according to claim 19, wherein the user equipment is configured to operate in dual connectivity with simultaneous first and second connections to the first and second access nodes, respectively, wherein the first access node is configured to provide a single control plane connection for the user equipment to a core network of the mobile network, and wherein the second access node does not provide a control plane connection for the user equipment to the core network.

33. An access node for communicating in a mobile network, wherein the access node is configured to be connected via a connection to a user equipment, wherein the access node is configured to control a data transmission for the user equipment, wherein the data transmission for the user equipment is assisted by another access node of the mobile network which is connected to the user equipment via another connection, wherein the access node comprises a processing circuit configured to:
receive, from the user equipment, a failure notification indication indicative of a failure of the another connection and a failure reason related to an expiration of a timer with the timer being started after a predetermined number of counter fulfillments of a condition and the timer being stopped after a predetermined number of counter fulfillments of another condition, and
adapt the mobile network based on the received failure notification indication.

34. The access node according to claim 33, wherein the adaption of the mobile network comprises adaption of at least one connection between the user equipment and the mobile network based on the failure notification information.

35. The access node according to claim 33, wherein the second connection has failed, wherein the adaption comprises:
requesting to disconnect the second connection, and
stopping to employ the second access node for the data transmission for the user equipment.

36. The access node according to claim 33, wherein the user equipment is configured to operate in dual connectivity with simultaneous connections to the access node and the another access node, respectively, wherein the access node provides a single control plane connection for the user equipment to a core network of the mobile network, wherein the another access node does not provide a control plane connection for the user equipment to the core network.

37. A mobile network comprising:
a first access node;
a second access node; and
a user equipment configured to be connected via a first connection to the first access node and via a second connection to the second access node;
wherein the first access node is configured to control a data transmission for the user equipment;
wherein the second access node is configured to assist in the data transmission for the user equipment;
wherein the user equipment comprises a processing circuit configured to:
determine that the second connection has failed, wherein the determination comprises, for the second connection, usage of a timer in the user equipment and a counter in the user equipment, the counter being associated with fulfillment of a condition, wherein the failure of the second connection is determined by expiration of the timer, the timer being started after a predetermined number of counter fulfillments of the condition, and the timer being stopped after a predetermined number of counter fulfillments of another condition, and
send to the first access node a failure notification indication indicative of the failure of the second connection and a failure reason related to the expiration of the timer;
wherein the first access node comprises a processing circuit configured to:
receive the failure notification indication and the failure reason;
send, from the first access node to the second access node, a request to disconnect the second connection; and
stop to employ the second access node for the data transmission for the user equipment; and
wherein the second access node comprises a processing circuit configured to receive the request to disconnect the second connection.

* * * * *

UNITED STATES PATENT AND TRADEMARK OFFICE
CERTIFICATE OF CORRECTION

PATENT NO. : 10,959,151 B2
APPLICATION NO. : 16/815577
DATED : March 23, 2021
INVENTOR(S) : Dudda et al.

Page 1 of 3

It is certified that error appears in the above-identified patent and that said Letters Patent is hereby corrected as shown below:

In the Specification

In Column 1, Line 6, delete "2015," and insert -- 2015, now Pat. No. 10,631,222, --, therefor.

In Column 1, Line 40, delete "LTE radio access network" and insert -- LTE Evolved Universal Terrestrial Radio Access Network --, therefor.

In Column 2, Line 1, delete "source eNodeB 102 source eNodeB 104" and insert -- source eNodeB 104 --, therefor.

In Column 3, Line 3, delete "that" and insert -- that: --, therefor.

In Column 3, Line 14, delete "1B" and insert -- 1B, --, therefor.

In Column 5, Line 34, delete "Radio Resource Control" and insert -- Radio Link Control --, therefor.

In Column 6, Line 23, delete "marco" and insert -- macro --, therefor.

In Column 10, Line 67, delete "1B" and insert -- 1B, --, therefor.

In Column 16, Line 63, delete ""out-of sync"" and insert -- "out-of-sync" --, therefor.

In Column 19, Line 23, delete "Radio link failure (RLF)" and insert -- Radio Link Failure (RLF) --, therefor.

In Column 19, Lines 54-62, delete "Hence, in FIG. 9 RLF on the link to the source eNB 904 occurs and is registered within the UE 902. It will stop its transmission on this link and transmit an RLF warning indication towards the assisting eNB 908 (7) which will (since it is in RRC relaying mode) further forward this indication towards the source eNB 904. The source eNB 904 will then handover Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office* the UE 902 completely to the assisting eNB 908 since it can be sure the connection source 904-UE 902 is lost.".

In Column 20, Lines 50-51, delete "rlf-TimersAndConstants" and insert -- RLF-TimersAndConstants --, therefor.

In Column 21, Line 2, delete "ms400," and insert the same at Column 20, Line 66, after "ms300," as a continuation point.

In Column 21, Line 67, delete "below" and insert -- below; --, therefor.

In Column 22, Line 9, delete "detected" and insert -- detected; --, therefor.

In Column 22, Line 12, delete "connections" and insert -- connections. --, therefor.

In Column 22, Line 17, delete "below" and insert -- below; --, therefor.

In Column 22, Line 28, delete "connections" and insert -- connections. --, therefor.

In Column 23, Line 28, delete "to" and insert -- to: --, therefor.

In Column 23, Line 30, delete "cell" and insert -- cell. --, therefor.

In Column 23, Line 32, delete "to" and insert -- to: --, therefor.

In Column 23, Line 34, delete "other" and insert -- other. --, therefor.

In Column 23, Line 36, delete "cells" and insert -- cells: --, therefor.

In Column 23, Line 38, delete "measurements" and insert -- measurements. --, therefor.

In Column 23, Line 40, delete "cells" and insert -- cells. --, therefor.

In Column 23, Line 45, delete "measurements" and insert -- measurements: --, therefor.

In Column 23, Line 46, delete "failure" and insert -- failure. --, therefor.

In Column 23, Line 47, delete "reason" and insert -- reason. --, therefor.

In Column 23, Line 52, delete "status" and insert -- status. --, therefor.

In Column 24, Line 42, delete "out-of-syn" and insert -- out-of-sync --, therefor.

In Column 29, Line 13, delete ""booster"" and insert -- "booster". --, therefor.

In Column 29, Line 14, delete "1B" and insert -- 1B, --, therefor.

CERTIFICATE OF CORRECTION (continued)
U.S. Pat. No. 10,959,151 B2

In Column 29, Line 21, delete "hay" and insert -- may --, therefor.

In Column 30, Line 27, delete "according" and insert -- according to --, therefor.

In Column 30, Line 55, delete "measurement" and insert -- measurement, --, therefor.

In Column 31, Line 22, delete "comprises" and insert -- comprises: --, therefor.

In Column 34, Line 24, delete "anyone" and insert -- any one --, therefor.

In the Claims

In Column 37, Line 9, in Claim 23, delete "the" and insert -- an --, therefor, first occurrence.